United States Patent
Yoon et al.

(10) Patent No.: US 10,055,086 B2
(45) Date of Patent: Aug. 21, 2018

(54) MOBILE TERMINAL AND METHOD FOR CONTROLLING THE SAME

(71) Applicant: LG ELECTRONICS INC., Seoul (KR)

(72) Inventors: Sunghye Yoon, Seoul (KR); Sooyon Chung, Seoul (KR); Sujin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/360,943

(22) Filed: Nov. 23, 2016

(65) Prior Publication Data
US 2017/0147180 A1     May 25, 2017

(30) Foreign Application Priority Data
Nov. 23, 2015    (KR) ........................ 10-2015-0164133

(51) Int. Cl.
| | |
|---|---|
| G06T 15/00 | (2011.01) |
| G06F 3/0481 | (2013.01) |
| G06F 3/0488 | (2013.01) |
| G06T 15/20 | (2011.01) |
| G06F 3/0484 | (2013.01) |

(Continued)

(52) U.S. Cl.
CPC ..... *G06F 3/04815* (2013.01); *G01C 21/3638* (2013.01); *G02B 27/0093* (2013.01); *G02B 27/0172* (2013.01); *G06F 1/1694* (2013.01); *G06F 3/011* (2013.01); *G06F 3/012* (2013.01); *G06F 3/017* (2013.01); *G06F 3/04845* (2013.01); *G06F 3/04883* (2013.01); *G06F 3/14* (2013.01); *G06T 15/20* (2013.01); *G02B 2027/0178* (2013.01); *G06F 1/163* (2013.01); *G06F 3/16* (2013.01);

(Continued)

(58) Field of Classification Search
CPC .... G06F 3/04815; G06F 3/04845; G06F 3/14; G06F 2203/04808; G06F 3/16; G06F 3/011; G06F 3/012; G06F 3/017; G06F 2200/163; G06T 2215/16; G06T 15/20; G02B 27/0172; G02B 27/0093; G02B 2027/0178; G01C 21/3638
USPC ........................................................ 345/418
See application file for complete search history.

(56) References Cited

U.S. PATENT DOCUMENTS

| | | | |
|---|---|---|---|
| 7,272,498 B2 * | 9/2007 | Singh ................ | G01C 21/3647 340/995.19 |
| 7,865,306 B2 * | 1/2011 | Mays ................... | G01C 21/36 340/995.19 |

(Continued)

OTHER PUBLICATIONS

PCT International Application No. PCT/KR2016/012932, International Search Report dated Mar. 3, 2017, 3 pages.

*Primary Examiner* — Phu K Nguyen
(74) *Attorney, Agent, or Firm* — Lee, Hong, Degerman, Kang & Waimey PC

(57) ABSTRACT

Disclosed herein are a mobile terminal and a method for controlling the mobile terminal. The present invention includes a touch screen, and a controller configured to display a 3D view in a first direction on the touch screen with a view point of a first location when the controller displays a 2D map on the touch screen and receives a touch input in the first direction from the first location of the 2D map. According to an embodiment of the present invention, a user may check the 3D view in a particular direction from a particular location in the 2D map.

20 Claims, 50 Drawing Sheets

(51) Int. Cl.
| | |
|---|---|
| *G06F 3/14* | (2006.01) |
| *G02B 27/01* | (2006.01) |
| *G02B 27/00* | (2006.01) |
| *G01C 21/36* | (2006.01) |
| *G06F 3/01* | (2006.01) |
| G06F 3/16 | (2006.01) |
| G06F 1/16 | (2006.01) |

(52) U.S. Cl.
CPC ............... *G06F 2200/1637* (2013.01); *G06F 2203/04803* (2013.01); *G06F 2203/04808* (2013.01); *G06T 2215/16* (2013.01)

(56) References Cited

U.S. PATENT DOCUMENTS

| | | | |
|---|---|---|---|
| 9,041,741 B2 * | 5/2015 | Mabbutt | ............... G06T 19/006 |
| | | | 345/156 |
| 9,261,955 B2 * | 2/2016 | Lee | ................... G02B 27/0172 |
| 9,482,548 B2 * | 11/2016 | Grabar | ............... G01C 21/3647 |
| 9,495,007 B2 * | 11/2016 | Lee | ................... G02B 27/0172 |
| 9,761,057 B2 * | 9/2017 | Salter | ..................... G06T 19/006 |
| 2010/0305844 A1 | 12/2010 | Choi et al. | |
| 2012/0253665 A1 | 10/2012 | Forstall et al. | |
| 2013/0050131 A1 | 2/2013 | Lee et al. | |
| 2014/0267400 A1 | 9/2014 | Mabbutt et al. | |
| 2015/0051835 A1 | 2/2015 | Jung et al. | |

* cited by examiner

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2015-0164133, filed on Nov. 23, 2015, the contents of which are all hereby incorporated by reference herein in its entirety.

BACKGROUND OF THE DISCLOSURE

Field of the Disclosure

Embodiments of the invention relate to a mobile terminal enabling a user to use 2D and 3D maps for the purpose of user convenience, and a method for controlling the mobile terminal.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, a 2D map or a 3D map is generally used in a terminal. Accordingly, there are increasing demands for a user interface that enables a user to use the 2D or 3D map in the terminal more easily and conveniently.

SUMMARY OF THE DISCLOSURE

Accordingly, an object of the present invention is to address the above-noted and other problems.

An object of the present invention is to solve the foregoing and other problems. Another object is to provide a mobile terminal enables a user to directly check a 3D view of a particular direction from a particular location on a 2D map, and a method for controlling the mobile terminal.

According to an aspect of the present invention to achieve the above and other objects, the present invention provides a mobile terminal comprising a touch screen; and a controller configured to display a 2D map on the touch screen, and, in response to reception of a touch input toward a first direction at a first location on the 2D map, display a 3D view of the first direction with a view point of the first location.

In response to reception of an input for returning back the 3D view to the 2D map, the controller may display the 2D map on the touch screen, and display, in the 2D map, a search area matching with an area which is displayed in the form of the 3D.

the controller may display on the touch screen a 3D view along the movement of the view point from the first location to a second location, and, in response to reception of the input for returning to the 2D map, the controller may display, in the 2D map, a search area matching with an area which is displayed in the form of the 3D view along the movement of the view point.

The controller may distinguishably display an area which has been displayed in the form of the 3D view for more than a predetermined period of time in the search area displayed in the 2D map.

The mobile terminal may further comprise a memory, wherein the controller may store, in the memory, the 3D view along the movement of the view point from the first location to the second location or the 2D map in which the search area is displayed in the memory.

In response to reception of an input for selecting a particular location in the search area displayed in the 2D map, the controller may display on the touch screen a 3D view from the first location to the particular location among stored 3D views.

The mobile terminal may further comprise a wireless communication unit, wherein in which the stored search area is displayed in response to reception of a drag input toward one edge of the touch screen after a multi-touch, the controller may transmit one of the stored 3D view or the 2D map in which the stored search area is displayed to an external device through the wireless communication unit according to a number of touches of the multi-touch.

The mobile terminal may further comprise a microphone and a sensing unit configured to sense tilt or movement of the mobile terminal, wherein the controller may be configured to display the 2D map or the 3D view on the touch screen based on an audio signal input through the microphone and based on the tilt or the movement of the mobile terminal sensed by the sensing unit.

The controller may sense tilt which is caused by rotation of the mobile terminal with respect to a virtual straight line perpendicular to the touch screen through the sensing unit, and the controller may convert the 2D map into the 3D view, or vice versa, by comparing the sensed tilt value with a predetermined tilt value.

The controller may be configured to sense rotation of the mobile terminal through the sensing unit with respect to a virtual straight line which is in the same plane as the touch screen and perpendicular to a ground surface, and the controller may be configured to rotate the first location based on the rotation of the mobile terminal.

The controller may be configured to change a scale of the 2D map or the 3D view displayed on the touch screen according to forward or backward movement of the mobile terminal.

In a case where a drag input toward a central point from one edge of the touch screen is received when the 3D view is displayed on the touch screen, the controller may be configured to reduce an area in which the 3D view is displayed according to the drag input and to display the 2D map in a different area of the touch screen.

The mobile terminal may further comprise a wireless communication unit configured to establish connection to a glasses-type mobile terminal, wherein when the glasses-type mobile terminal is in an active state, the controller may be configured to transmit a signal for displaying the 3D view to the glasses-type mobile terminal.

In a case where a user wearing the glasses-type mobile terminal checks the touch screen, the controller may be configured to display, on the touch screen, the 3D view displayed in the glasses-type mobile terminal.

In a case where a gesture for requesting the 3D view is sensed in the glasses-type mobile terminal, the controller may be configured to transmit a signal for displaying the 3D view to the glasses-type mobile terminal.

In a case where a gesture for requesting the 3D view along the movement of the view point is sensed from the glasses-type mobile terminal, the controller may be configured to transmit a signal for displaying the 3D view along the movement of the view point to the glasses-type mobile terminal.

In a case where a gesture for requesting a 3D view along a path different from a path of the movement of the view point is sensed in the glasses-type mobile terminal while the 3D view along the movement of the view point is displayed on the glasses-type mobile terminal, the controller may be configured to transmit a signal for displaying the 3D view along the different path to the glasses-type mobile terminal.

In a case where a gesture for requesting a 3D view to the first location from a current location of a user is sensed in the glasses-type mobile terminal, the controller may be configured to transmit a signal for displaying the 3D view to the first location from the current location of the user to the glasses-type mobile terminal.

In a case where a gesture for requesting a 3D view to the second location from a current user location is sensed in the glasses-type mobile terminal, the controller may be configured to transmit a signal for displaying the 3D view to the second location from the current user location to the glasses-type mobile terminal.

According to another aspect of the present invention, a method for controlling a mobile terminal may comprise displaying a 2D map on a touch screen; receiving a touch input in a first direction from a first location of the 2D map; and displaying a 3D view in the first direction on the touch screen with a view point of the first location.

Advantages of a mobile terminal and a method for controlling the same according to an embodiment of the present invention are described in the following.

According to at least one embodiment of the present invention, a 3D view is displayed in a particular direction in accordance with a touch input applied to a 2D map on a touch screen, so that a user can check the 3D view in a particular direction from a particular location in the 2D map.

According to at least one embodiment of the present invention, a search area matching with an area displayed in a 3D view is displayed in a 2D map when the 3D view is converted into the 2D map, so that a user can check the search area displayed in the 3D view directly from the 2D map.

According to at least one embodiment of the present invention, a search area matching with an area displayed in a 3D view along movement of a view point is displayed in a 2D map, so that a user can check the searched path from the 3D view directly from the 2D map.

According to at least one embodiment of the present invention, an area which has been displayed in the form of a 3D view for more than a predetermined period of time is distinguishably displayed in the search area displayed in the 2D map, so that a user can intuitively recognize a mainly searched area in an area searched using the 3D view.

According to at least one embodiment of the present invention, a 3D view to a particular location is displayed among stored 3D views according to an input for selecting a particular location in a search area, so that a user can easily check a desired area in the search area.

According to at least one embodiment of the present invention, a stored 3D view or a stored 2D map is transmitted to an external device according to a multi-touch input, so that a user can easily share the stored search area.

According to at least one embodiment of the present invention, a 2D map or a 3D view is displayed according to a voice or tilt of a mobile terminal, so that a user can conveniently check the 2D map or the 3D view.

According to at least one embodiment of the present invention, a 2D map is converted into a 3D view, or vice versa, according to tilt caused by rotation of a mobile terminal, so that a user can easily converts the 2D map into the 3D view, or vice versa.

According to at least one embodiment of the present invention, a direction in which a 3D view is to be displayed is rotated based on sensed rotation of a mobile terminal, so that a user can easily change the direction in which the 3D view is to be displayed.

According to at least one embodiment of the present invention, a scale of a 2D map or a 3D view is changed according to forward or backward movement of a mobile terminal, so that a user can conveniently change the scale of the 2D map or the 3D view.

According to at least one embodiment of the present invention, a 2D map and a 3D view are displayed together according to a predetermined touch input, so that a user can easily confirm an area in which the 3D view is displayed in the 2D map.

According to at least one embodiment of the present invention, a signal for displaying a 3D view is transmitted to a glasses-type mobile terminal, so that a user can check a 3D view of the selected area in a 2D map through the glasses-type mobile terminal.

According to at least one embodiment of the present invention, when a user wearing a glasses-type mobile terminal checks a touch screen, a 3D view displayed on the glasses-type mobile terminal is displayed on the touch screen, so that a user can easily convert the 3D view between the glasses-type mobile terminal and a mobile terminal.

According to at least one embodiment of the present invention, a signal for displaying a 3D view is transmitted to a glasses-type mobile terminal in accordance with a gesture sensed in the glasses-type mobile terminal, so that a user can check the 3D view in the glasses-type mobile terminal by taking a simple gesture.

According to at least one embodiment of the present invention, a signal for displaying a 3D view along movement of a view point is transmitted to a glasses-type mobile terminal in accordance with a gesture sensed in the glasses-type mobile terminal, so that a user can check the 3D view along the movement of the view point in the glasses-type mobile terminal by taking a simple gesture.

According to at least one embodiment of the present invention signal for displaying a 3D view along a different path is transmitted to a glasses-type mobile terminal in accordance with a gesture sensed in the glasses-type mobile terminal, so that a user can confirm the 3D view for the different path by taking a simple gesture.

According to at least one embodiment of the present invention, the controller can transmit a signal for displaying a 3D view to a particular location from a current user location to a glasses-type mobile terminal in accordance with a gesture sensed in the glasses-type mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
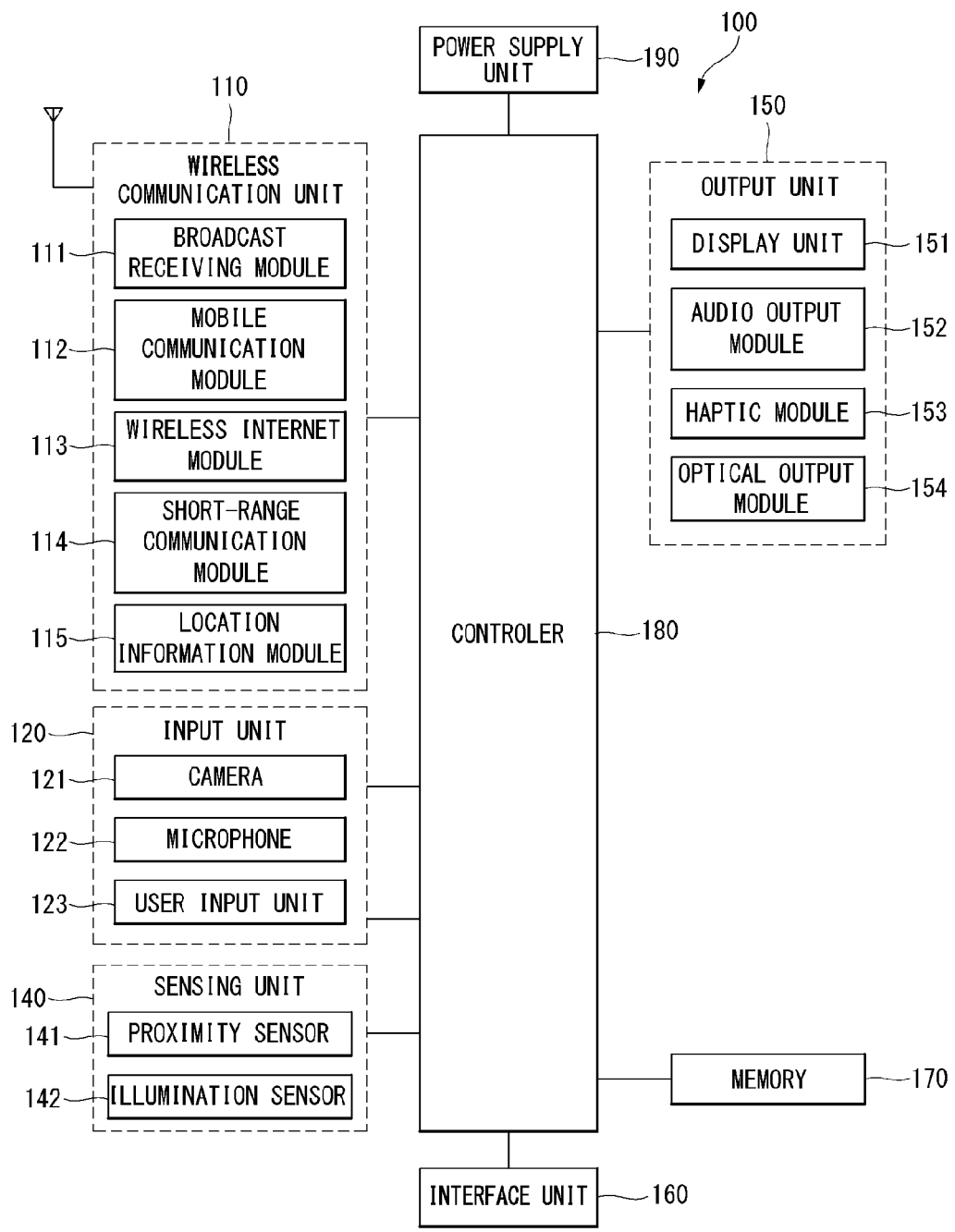
FIG. 1 is a block diagram of a mobile terminal according to an embodiment of the present invention.

Reference is now made to FIG. 1, where FIG. 1 is a block diagram of a mobile terminal according to an embodiment of the present invention.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving unit 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can confirm the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
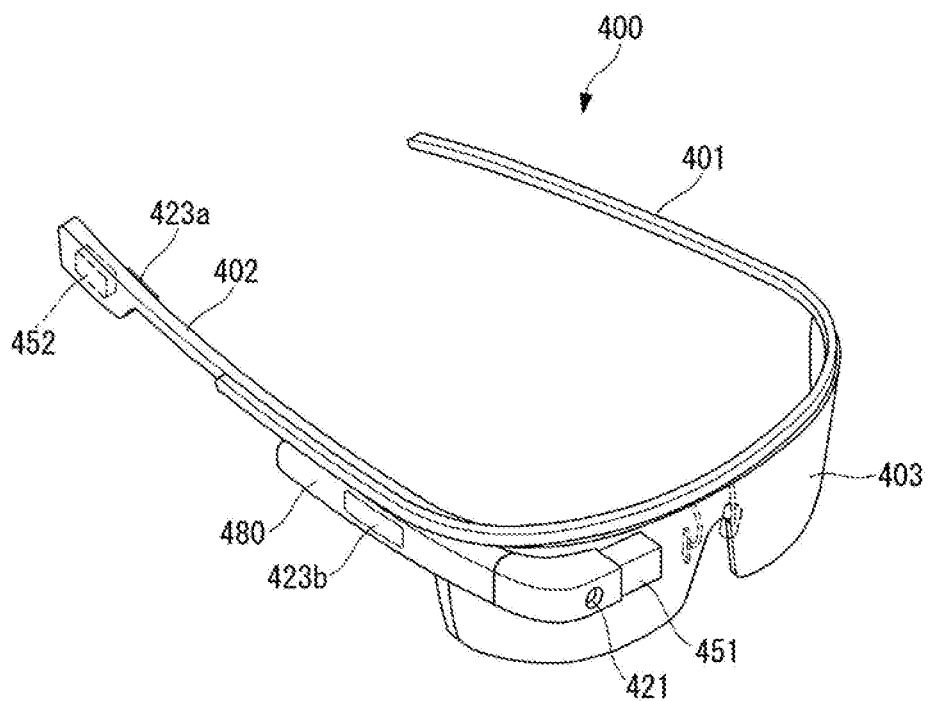
FIG. 2 is a conceptual view of a wearable mobile terminal according to another alternative embodiment of the present invention.

FIG. 2 is a perspective view illustrating one example of a glasses-type mobile terminal 400 according to another exemplary embodiment. The glasses-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIG. 1.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 2 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glasses-type mobile terminal 400, the display unit 451 may be located to correspond to either or both of the left and right eyes. FIG. 2 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glasses-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Further preferred embodiments will be described in more detail with reference to additional drawing figures. It is understood by those skilled in the art that the present features can be embodied in several forms without departing from the characteristics thereof.

Hereinafter, embodiments of the above-described control method which may be implemented in the mobile terminal configured as above are described with reference to the accompanying drawings. It is apparent to those skilled in the art that various modifications can be made to the invention without departing from the spirit and essential features of the present invention.

Figure 3:
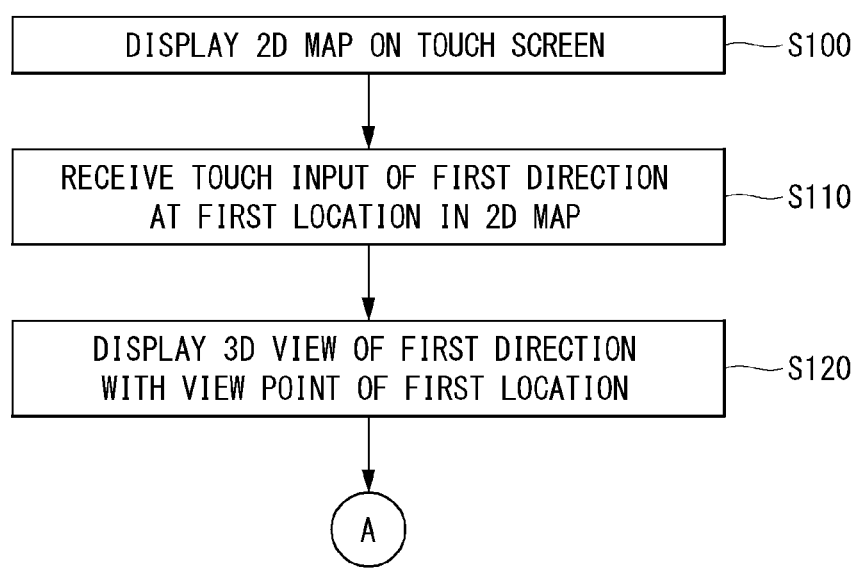
FIG. 3 is a flowchart of a method for controlling a mobile terminal according to an embodiment of the present invention, the mobile terminal which displays a 3D view in a particular direction.

FIG. 3 is a flowchart of a method for controlling a mobile terminal according to an embodiment of the present invention, the mobile terminal which displays a 3D view in a particular direction. FIGS. 4 to 7 are diagrams illustrating an example according to an embodiment of the present invention, an example in which a 3D view is displayed in a particular direction in accordance with a touch input applied to a 2D map.

A method for controlling a mobile terminal according to an embodiment of the present invention may be implemented in the mobile terminal 100 described with reference to FIG. 1. Hereinafter, a method for controlling a mobile terminal according to an embodiment of the present invention, and the mobile terminal 100 implementing the method are described in detail with related drawings.

Referring to FIG. 3, a controller 180 may display a 2D map on a touch screen 151 in S100.

Figure 4:
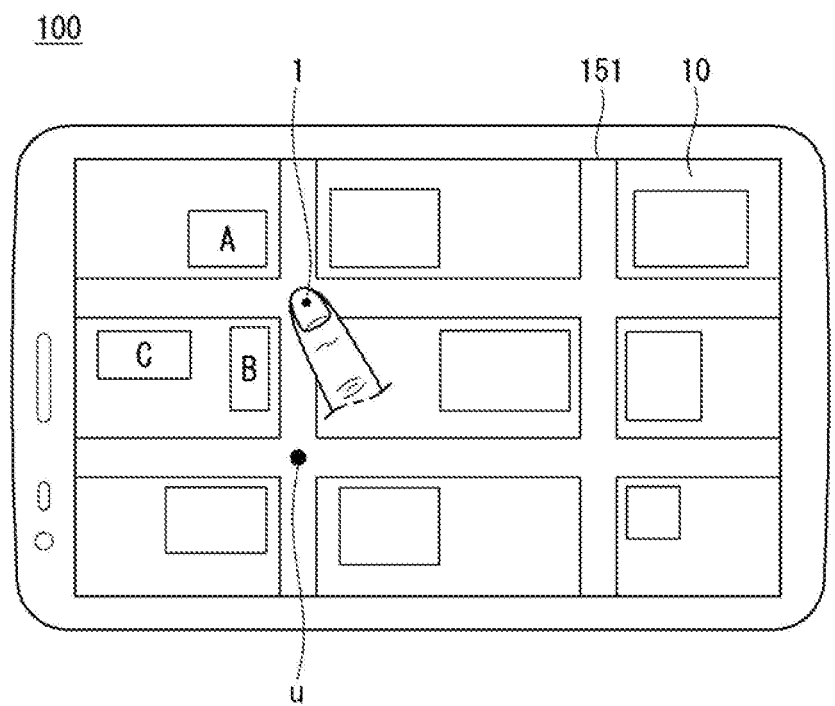
FIGS. 4 to 7 are diagrams for explaining an example according to an embodiment of the present invention, the example in which a 3D view is displayed in a particular direction in accordance with a touch input applied to a 2D map.

FIG. 4 shows a case where a 2D map 10 of a specified area is displayed on the touch screen 151 of the mobile terminal 100. The 2D map 10 may be displayed upon execution of a map application. According to an embodiment of the present invention, the map application may be any application that is capable of displaying a 2D and 3D map view, regardless of its name or type.

When a user executes a map application, the controller 180 may display the 2D map 10 based on map data stored in the memory 170. Alternatively, the 2D map 10 may be displayed using the map data received through the wireless communication unit 110.

According to an example, as shown in FIG. 4, the controller 180 may display location u of the mobile terminal 100 in the 2D map 10. That is, the controller 180 may display a location of a use of the mobile terminal 100. Information on the location u of the mobile terminal 100 may be obtained using a location information module 115. Obtaining the location information of the mobile terminal 100 complies with a well-known method, and thus, detailed description thereof is omitted.

Again referring to FIG. 3, the controller 180 may receive a touch input of a first direction at a first location of the 2D map 10 in S110.

For convenience of explanation, it is assumed that a user wants to check a 3D view of objects A, B, and C (for examples, buildings) being placed on the left side of a first location 1. Referring to FIG. 4, the user may select the first location 1, a 3D view of which the user wants to check, from the 2D map 10 that is now being displayed on the touch screen 151. The user may select the first location 1 by applying a predetermined touch input to the first location 1.

Figure 5:
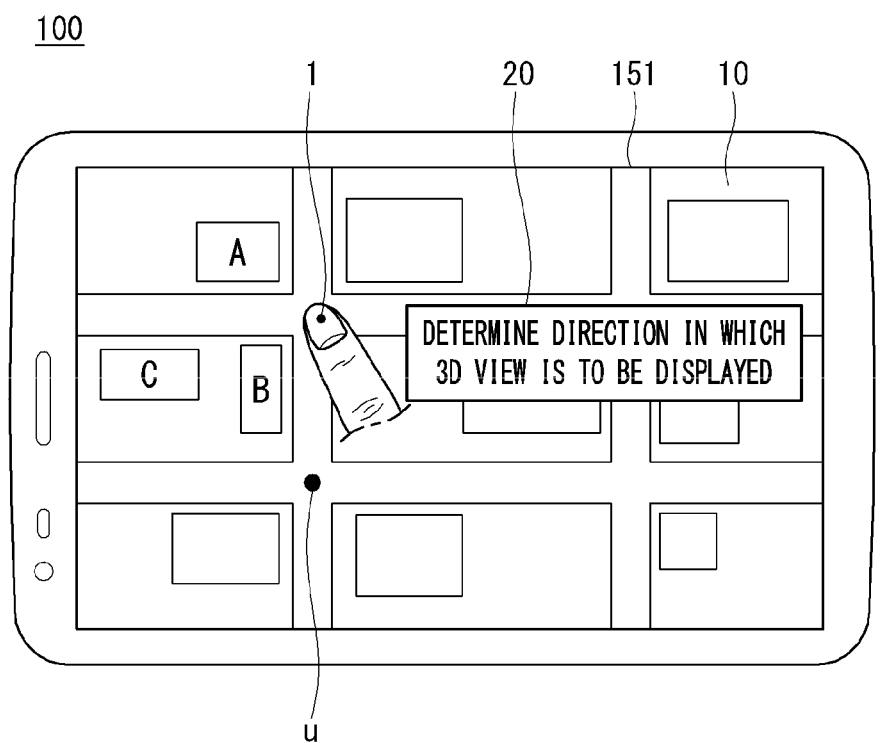

According to an example, the predetermined touch input may be a long touch input that is applied for more than a predetermined period of time. When the long touch input is applied, the controller 180 may display a notification window 20 that requests the user to determine a direction in which a 3D view is to be displayed, as shown in FIG. 5.

However, it is merely exemplary, and aspects of the present invention are not limited thereto. According to another example, instead of using the notification window 20, the controller 180 may display an indicator to indicate that a direction in which a 3D view is to be displayed is able to be selected. According to yet another example, the controller 180 may display a 3D view mode button in one area of the touch screen 151. In this case, a direction in which a 3D view is to be displayed may be selected according to a touch input or a drag input that is applied after the 3D view mode button is selected.

In addition, the long touch input is merely an example of the input for displaying the 3D view, and aspects of the present invention are is not limited thereto. Various types of touches or a combination thereof may be set as the predetermined touch input, and the various types of touches may include a short touch, a long touch, a multi-touch, a drag touch, a flick touch, a pinch-in touch, a pinch-out touch, a swipe touch, a hovering touch, and the like. In this case, the predetermined touch input may be set to be distinguishable from a general drag input for moving an area displayed in the 2D map.

Figure 6:
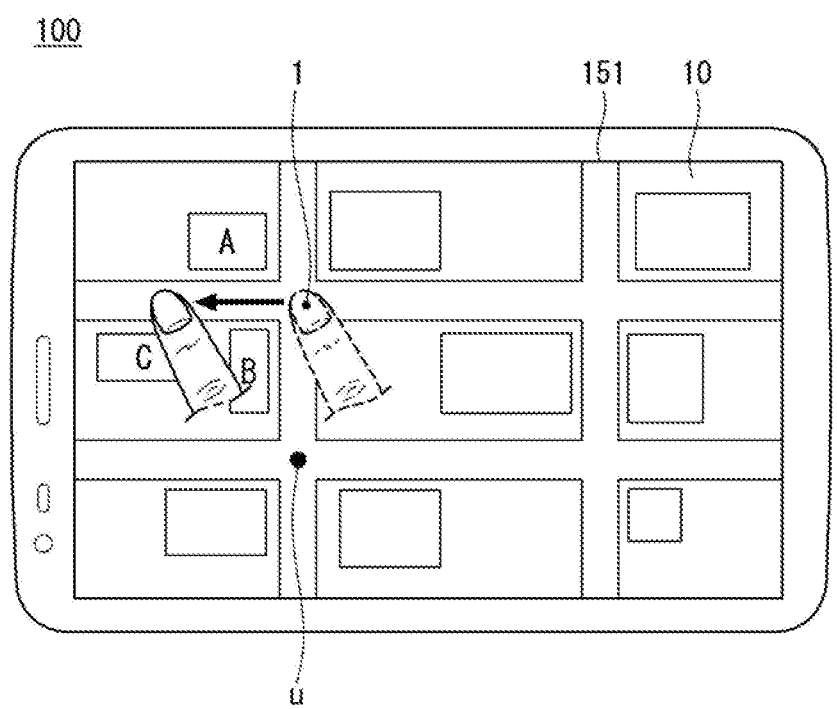

Referring to FIG. 6, according to an example, a user may apply a drag input of a left direction, a 3D view of which is desired to be checked, to a first location 1. In response to reception of the drag input, the controller 180 may set the direction of the drag input as a first direction in which a 3D view is to be displayed.

However, the drag input is merely exemplary, and aspects of the present invention are not limited thereto. If the controller 180 is capable of setting a first direction in which a 3D view is to be displayed, inputs applied in other ways may be used as well. For example, a user may select the first location 1, and then select a location different from the first location 1. The controller 180 may set a direction from the first location 1 to the other location as the first direction.

Referring to FIG. 3, the controller 180 may display a 3D view of the first direction on the touch screen 151 by setting the first position as a view point in S120.

The view point may refer to a virtual location facing the first direction from the first location 1. For example, the view point may be set to be a predetermined average eye level of a person at the first location 1. Alternatively, the view point may be set on the assumption that a virtual camera is located at the first location 1 at a predetermined height.

Figure 7:
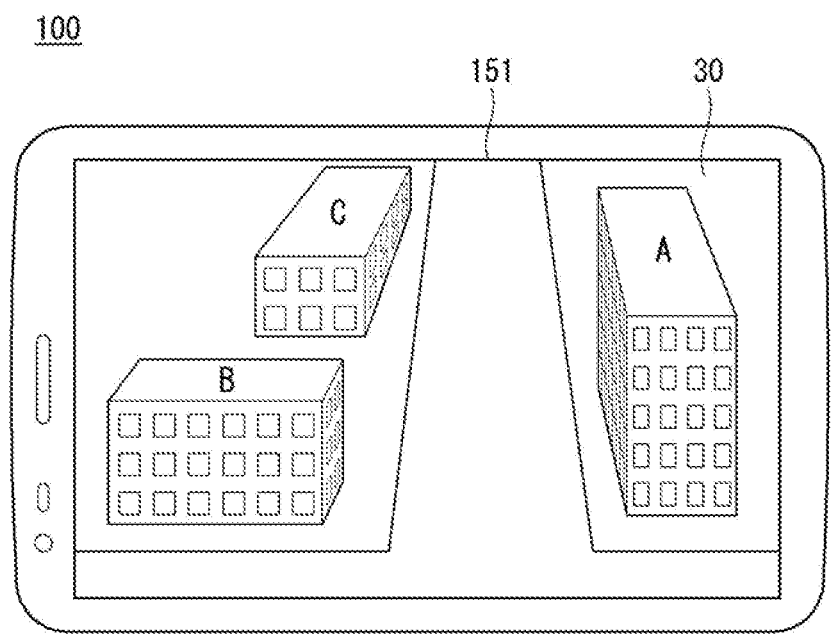

Referring to FIG. 7, the controller 180 may display a 3D view 30 of the first direction from the view point on the touch screen 151. According to an example, the controller 180 may display the 3D view 30 such that the first direction is toward the top of the touch screen 151. That is, according to an embodiment of the present invention, the user may be able to check a 3D view of a desired direction at a particular location, without adjusting a location and a direction which are to be displayed in the 2D map in the form of a 3D view.

FIG. 7 shows a case where objects A, B, and C, roads in a predetermined range are displayed in the form of the 3D view 30. The predetermined range may be set in advance based on an angle from the view point, a scale, etc. According to an example, the controller 180 may adjust the predetermined range according to tilt or movement of the mobile terminal 100.

According to an example, the controller 180 may display the 3D view 30 based on map data stored in the memory 170. The map data may include 2D map data and data for generating the 3D view. Generating a 3D view 30 may be performed in a well-known method, such as rendering, and it is not limited to a particular method.

The controller may display a 3D view 30 in a particular direction according to the touch input applied to the 2D map 10 that is now being displayed on the touch screen 151, so that the user can immediately check the 3D view 30 of the particular direction at a particular location in the 2D map 10.

Figure 8:
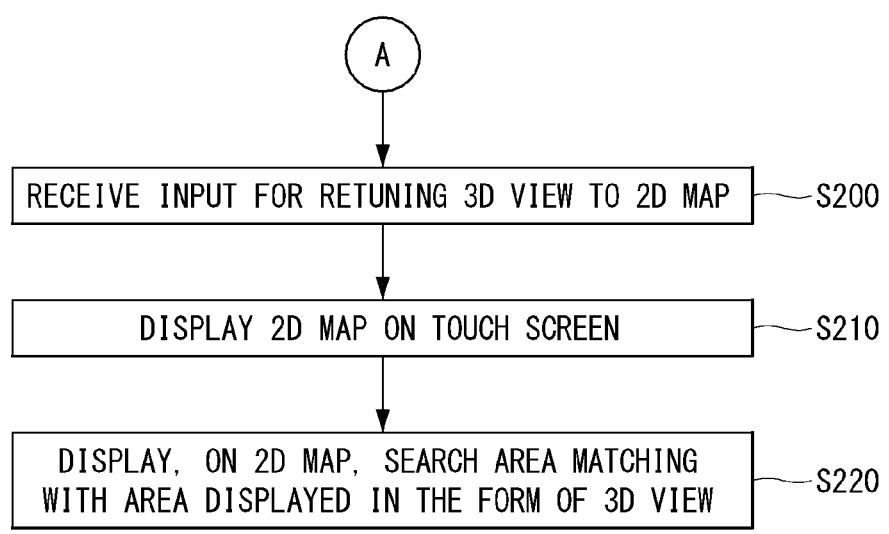
FIG. 8 is a flowchart of a method for controlling a mobile terminal, which displays on a 2D map an area displayed in a 3D view, according to an embodiment of the present invention.
Figure 9:
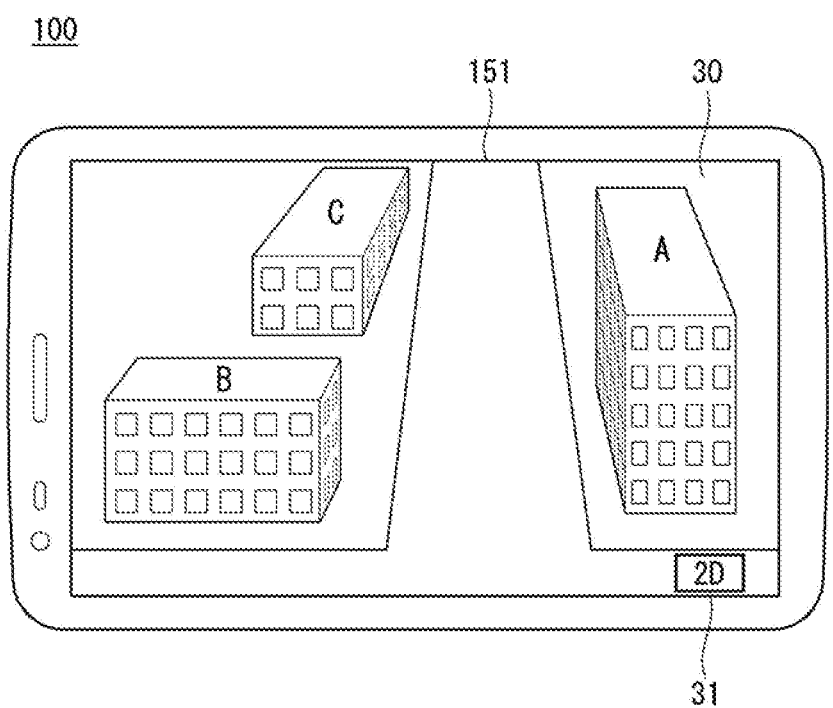
FIGS. 9 and 10 are diagrams for explaining an example according to an embodiment of the present invention, the example in which a search area matching with an area displayed in a 3D view is displayed on a 2D map in the case of conversion into the 2D map.
Figure 10:
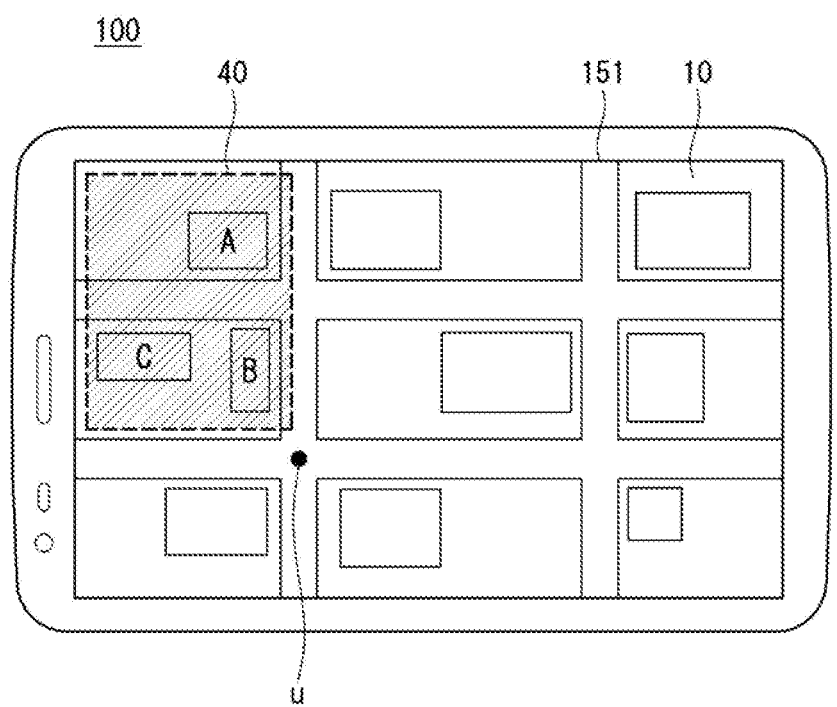

FIG. 8 is a flowchart of a method for controlling a mobile terminal according to an embodiment of the present invention, the mobile terminal which displays, in a 2D map, an area displayed in the form of a 3D view. FIGS. 9 and 10 are diagrams illustrating an example according to an embodiment of the present invention, the example in which a search area matching with an area displayed in the form of a 3D view when the 3D view is converted into the 2D map.

Referring to FIG. 8, when the 3D view is displayed in the first direction, the controller 180 may receive an input for returning the 3D view 30 to the 2D map 10 in S200.

According to an example, when the 3D view 30 is displayed, the controller 180 may display, in one area of the touch screen 151, a button 31 for returning to the 2D map, as shown in FIG. 9. The input for returning to the 2D map 10 may be an input for selecting the button 31.

However, this is merely exemplary, and aspects of the present invention are not limited thereto. The input for returning to the 2D map 10 may be set to be a predetermined touch input. For example, the input for returning to the 2D map 10 may be set to be an input which is made by a user such that the user touches any two locations for more than a predetermined period of time when the 3D view 30 is displayed. However, aspects of the present invention are not limited thereto, and various types of touches and a combination thereof may be set as the input for returning to the 2D map 10. The various types of touches may include a short touch, a long touch, a multi-touch, a drag touch, a flick touch, a pinch-in touch, a pinch-out touch, a swipe touch, a hovering touch, and the like.

Referring again to FIG. 8, the controller 180 may display the 2D map 10 on the touch screen 151 in S210, and display, in the 2D map, a search area matching with an area displayed in the form of the 3D view in S220.

In response to reception of the input for returning to the 2D map 10, the controller 180 may display, on the touch screen 151, the 2D map 10 that was displayed prior to the 3D view 30, as shown in FIG. 10. The controller 180 may match an area displayed in the form of the 3D view 30 with an area in the 2D map 10. The matching may be performed based on the process for generating the 3D view 30 based on map data stored in the memory 170.

The controller 180 may set the area in the 2D map 10, which matches with the area displayed in the form of the 3D view 30, as a search area 40. As shown in FIG. 10, the controller 180 may display the search area 40 in the 2D map 10. According to an example, the search area 40 may be displayed in a color distinguishable from other areas. However, this is merely exemplary, and aspects of the present invention are not limited thereto. To display the search area 40 distinguishably from the other areas, a variety of effects, such as color, shapes, symbols, and highlighting may be applied to the search area 40.

Accordingly, when the 3D view 30 is converted into the 2D map 10, the search area 40 matching with the area displayed in the form of the 3D view is displayed in the 2D map, so that the user can directly check the search area 40, which was searched in the form the 3D view 30, in the 2D map 10.

According to an example, the description provided with reference to FIG. 8 may be applied in the assumption that the 3D view is displayed in the first direction in step S120 shown in FIG. 3. However, aspects of the present invention are not limited thereto. According to another example, the description provided with reference to FIG. 8 can be substantially equally applied even in a case where a 3D view is first displayed and then converted into a 2D map. In this case, the displayed 2D map may include the area displayed in the form of the 3D view.

Figure 11:
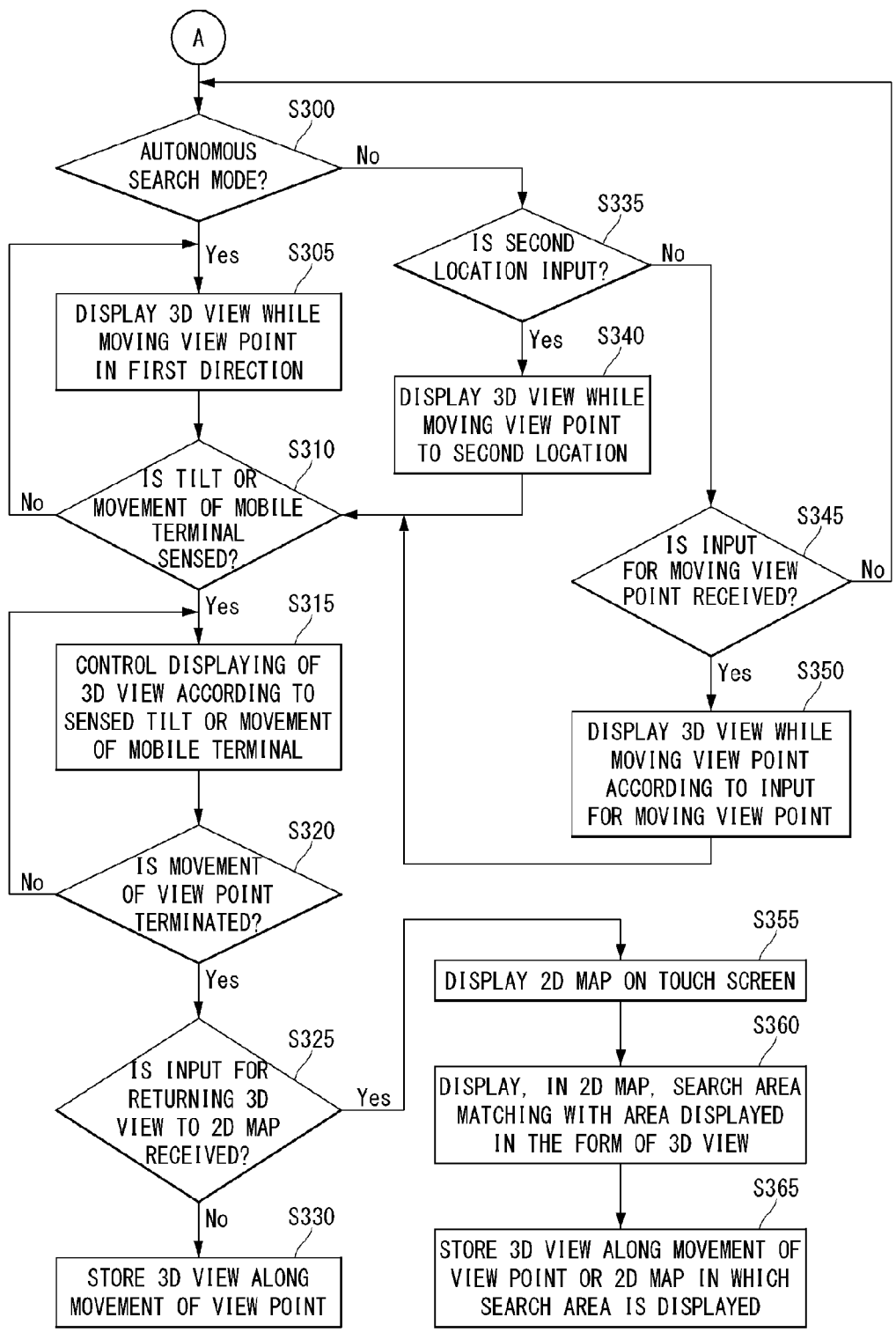
FIG. 11 is a flowchart of a method for controlling a mobile terminal according to an embodiment of the present invention, the mobile terminal which displays a 3D view along movement of a view point.

FIG. 11 is a flowchart of a method for controlling a mobile terminal according to an embodiment of the present invention, the mobile terminal which displays a 3D view along movement of a view point. FIGS. 12 to 16 are diagrams illustrating an example according to one embodiment of the invention, the example in which a search area matching with an area displayed in the form of a 3D view is displayed in a 2D map along movement of a view point.

When the 3D view is displayed in the first direction, the controller 180 may display, on the touch screen 151, a 3D view along movement of the view point from the first location to the second location. Then, in response to reception of the input for returning to the 2D map 10, the controller 180 may display, in the 2D map 10, a search area which matches with an area displayed in the form of the 3D view along the movement of the view point. Hereinafter, the aforementioned operation is described in detail with reference to FIG. 11.

Referring to FIG. 11, when the 3D view is displayed in the first direction, the controller 180 may check whether an autonomous search mode is on in S300. The autonomous search mode may refer to a state that a 3D view displayed on the touch screen 151 is updated at the pre-determined speed in the first direction. According to an example, when the 3D view is displayed, the controller 180 may be set in advance to enter the autonomous search mode.

According to another example, the controller 180 may be set to enter the autonomous search mode when a predetermined input is received after the 3D view is displayed. Various types of touches and a combination thereof may be set as the predetermined input, and the various types of touches may include a short touch, a long touch, a multi-touch, a drag touch, a flick touch, a pinch-in touch, a pinch-out touch, a swipe touch, a hovering touch, and the like.

When the autonomous search mode is confirmed, the controller 180 may display the 3D view by moving the view point in the first direction in S305. In this case, the second location may refer to a location of a view point which moves at a preset speed. For example, referring to FIG. 12, a user may apply a drag input from the first location 2 to the second location 5 in order to check a 3D view.

In this case, the first direction may be set to be a direction to movement that goes upward and then goes in a right-hand direction, just like the direction of the drag input. At the first location 2, the controller 180 may display a 3D view 32 shown in FIG. 13 (*a*). The controller 180 may update the 3D view 32 by moving the viewpoint at the predetermined speed.

Figure 13:
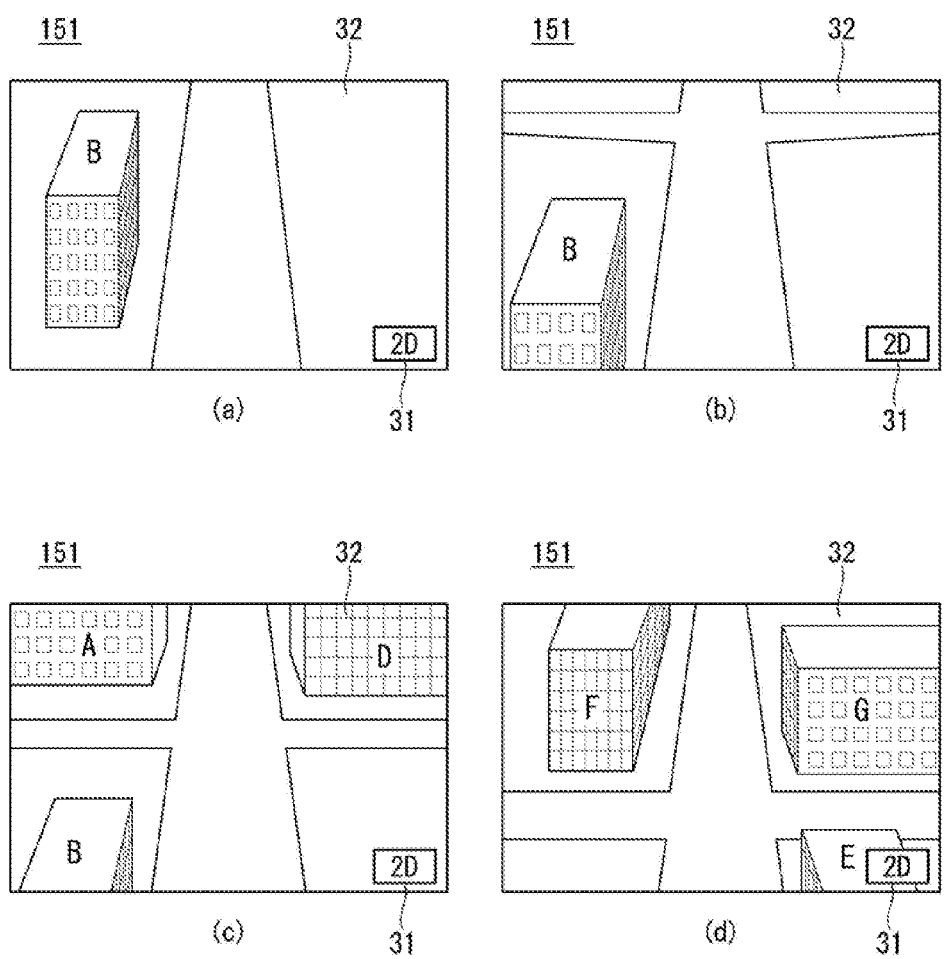

At a new location 3, the controller 180 may display a 3D view 32 as shown in FIG. 13 (*b*). Then, at a new location 4, he control unit 180 may display a 3D view 32 shown in FIG. 13 (*c*). Thus, a 3D view 32 may be continuously displayed along the movement of the view point.

Referring to FIG. 11, the controller 180 may determine in S310 as to whether tilt or movement of the mobile terminal 100 is sensed while the 3D view displayed along movement of the view point. If the tilt or the movement of the mobile terminal 100 is not sensed, the controller 180 may continue to display the 3D view in the first direction.

If the tilt or the movement of the mobile terminal 100 is sensed, the controller 180 may control displaying of the 3D view according to the sensed tilt or movement of the mobile terminal 100 in S315. For example, converting the 3D view into the 2D map, changing the first direction, or changing the scale of the 3D view may be performed. Detailed descriptions regarding this will be provided later with reference to FIG. 26.

Referring to FIG. 11, the controller 180 may determine whether the movement of the view point is terminated in S320. According to an example, the movement of the view point may be set to be terminated at the second location 5 dragged from the first location 2. In this case, if the movement of the view point reaches the second location 5, the controller 180 may display a 3D view 32, as shown in FIG. 13(*d*), and terminate the movement of the viewpoint.

However, this is merely exemplary, and aspects of the present invention are not limited thereto. If a predetermined input is applied in the autonomous search mode, the movement of the view point may be set to be terminated. In this case, various types of touches, a combination thereof, or tilt/movement of the mobile terminal may be set as the predetermined input, and the various types of touches may include a short touch, a long touch, a multi-touch, a drag touch, a flick touch, a pinch-in touch, a pinch-out touch, a swipe touch, a hovering touch, and the like.

Referring to FIG. 11, when the movement of the view point is terminated, the controller 180 may check whether the input for returning the 3D view to a 2D map is received in S325. When the input for returning to a 2D map is not received, the controller 180 may store, in a memory 170, the 3D view along the movement of the view point in S330.

Figure 14:
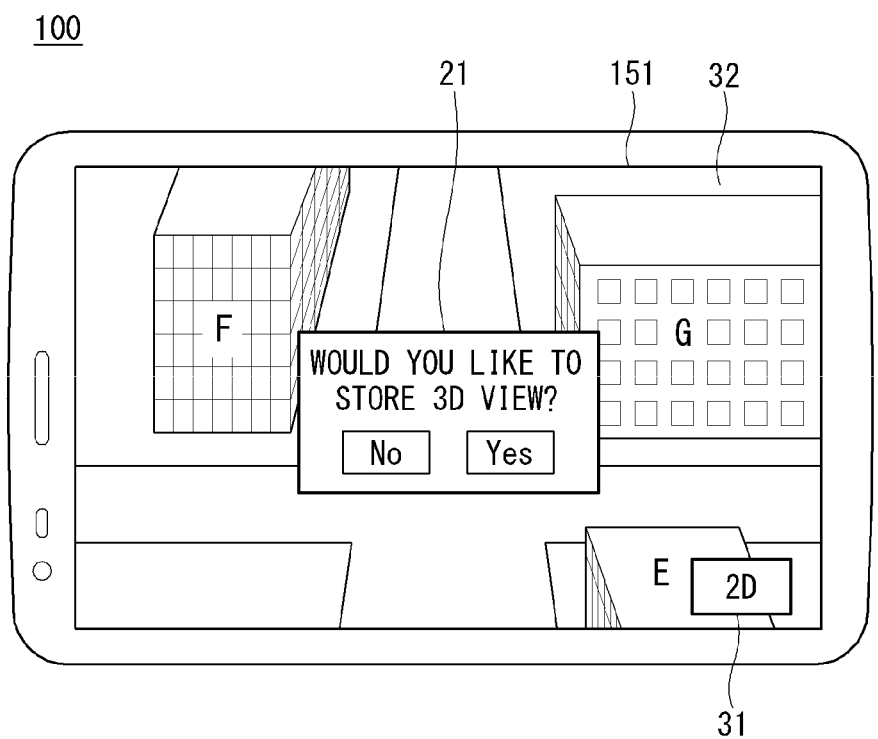

According to an example, when the input for returning to the 2D map is not received for a predetermined period of time, the controller 180 may display a notification window 21 for storing the 3D view along the movement of the view point, as shown in FIG. 14. When the user selects the Yes button, the controller 180 may store the 3D view along the movement of the view point.

The waiting for the predetermined period of time is merely exemplary, and aspects of the present invention are not limited thereto. According to another example, in response to reception of a predetermined input, the controller 180 may store the 3D view along the movement of the view point. Various types of touches, a combination thereof, or tilt/movement of a mobile terminal may be set as the predetermined input, and the various types of touches may include a short touch, a long touch, a multi-touch, a drag touch, a flick touch, a pinch-in touch, a pinch-out touch, a swipe touch, a hovering touch, and the like.

Figure 15:
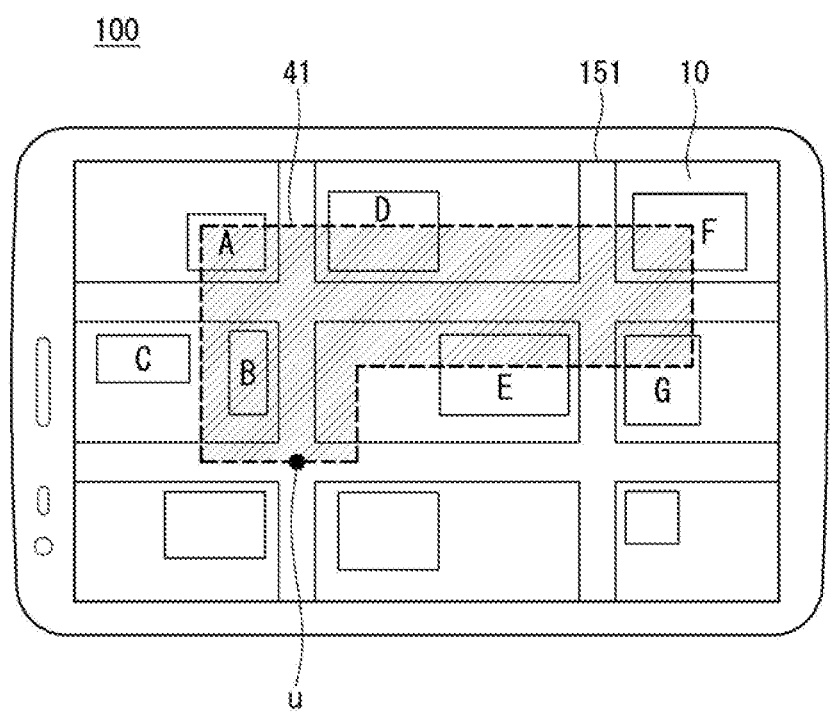

Referring to FIG. 11, when the input for returning to the 2D map is received, the controller 180 may display the 2D map 10 on the touch screen 151 in S355. FIG. 15 shows a case where the 2D map 10 is displayed on the touch screen 151. The controller 180 may display, the 2D map 10, a search area 41 which matches with an area displayed in the form of the 3D view 32 in S360. In this regard, the description provided with reference to FIG. 8 can be substantially equally applied.

Referring to FIG. 11, the controller 180 may store, in the memory 170, the 2D map in which the search area or the 3D view along the movement of the view point is displayed in S365.

Figure 16:
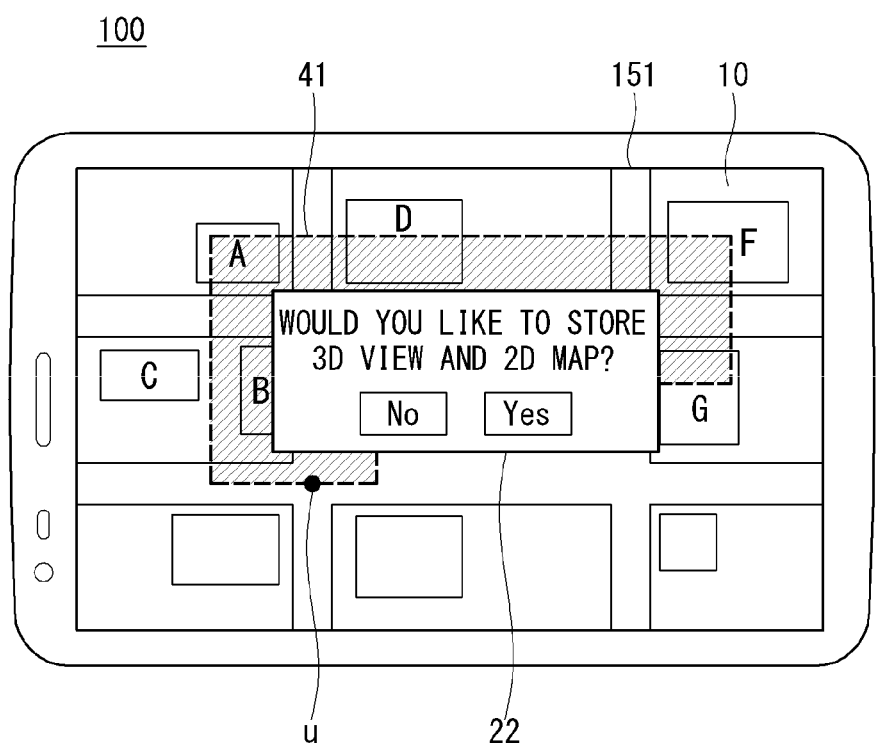

According to an example, the controller 180 may display a notification window 22, as shown in FIG. 16, for storing the 2D map on which the search area or the 3D view along the movement of the view point is displayed. When the user selects the Yes button, the controller 180 may store the 3D view along the movement of the view point and the 2D map in which the search area is displayed.

Displaying the notification window 22 is merely exemplary, and aspects of the present invention are not limited thereto. According to another example, in response to reception of a predetermined input, the controller 180 may store the 3D view along the movement of the view point and the 2D map in which the search area is displayed. Alternatively, in response to a predetermined input, the controller 180 may store one of the 3D view along the movement of the view point and the 2D map in which the search area is displayed, wherein the one to be stored corresponds to the predetermined input. Various types of touches, a combination thereof, or tilt/movement of a mobile terminal may be set as the predetermined input, and the various types of touches may include a short touch, a long touch, a multi-touch, a drag touch, a flick touch, a pinch-in touch, a pinch-out touch, a swipe touch, a hovering touch, and the like.

Figure 12:
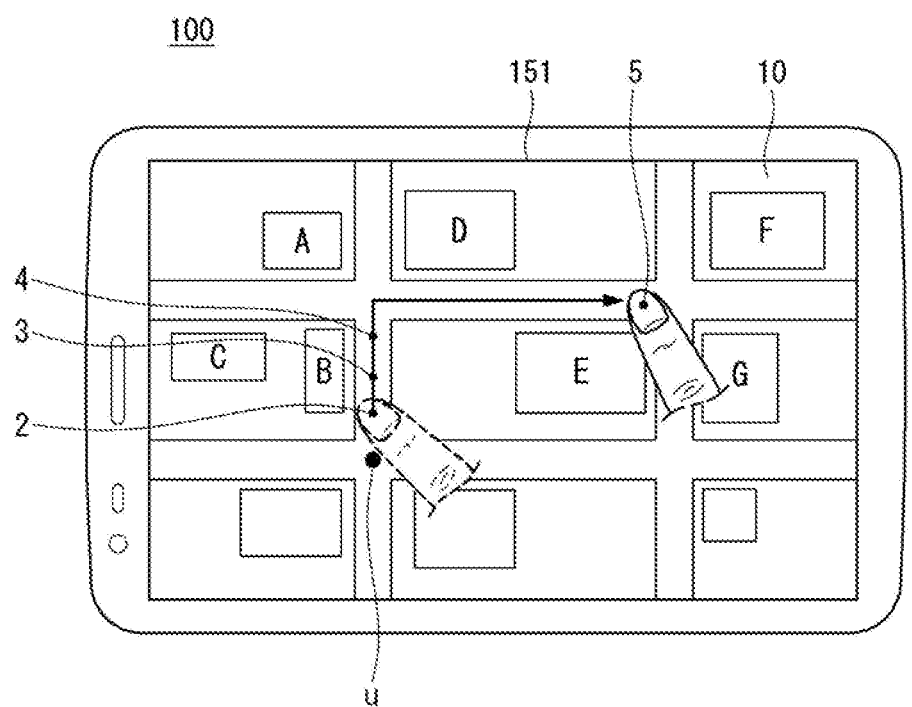
FIGS. 12 to 16 are diagrams illustrating an example according to an embodiment of the present invention, the example in which a search area matching with an area displayed in a 3D view is displayed in a 2D map along movement of a view point.

Referring to FIG. 11, if the controller 180 is not in the autonomous search mode, the controller 180 may determine whether the second location is input in S335. As shown in FIG. 12, it is assumed that a user has dragged an input to the second location 5 from the first location 2. In this case, the controller 180 may set the second location 5 as the final location of the drag input.

The controller 180 may display the 3D view 32 while the viewpoint moves to the second location 5 in S340. The description provided with reference to FIGS. 12 and 13 about displaying of the 3D view 32 along movement of a view point can be applied substantially and equally even to step in S340, and thus, the same description is not herein provided.

However, the drag input to the second location 5, which is applied in order to input the second location 5, is merely exemplary, and aspects of the present invention are not limited thereto. According to another example, the user may select the first location 2 and the second location 5 sequentially. The controller 180 may retrieve a path between the first location 2 and the second location 5 in the 2D map 10. The controller 180 may display the 3D view 32 while the viewpoint moves along the retrieved path.

After step S340, steps 310 to 335 may be performed again.

Referring to FIG. 11, when the second location is not input, the controller 180 may check whether the input for moving the view point is received in S345. When any input for moving the view point is not received, the controller 180 may check whether an autonomous search mode is on in S300.

Alternatively, when an input for returning the 3D view to a 2D map 10 is received, the controller 180 may display the 2D map 10 on the touch screen 151. Subsequent steps are the same as explained with reference to FIG. 8, and thus, detailed descriptions thereof are omitted.

Referring to FIG. 11, the controller 180 may display the 3D view 32 while moving the viewpoint in accordance with the input for moving the view point in S350. According to an example, the user can move the mobile terminal 100 back and forth while touching one location on the touch screen 151. In this case, the controller 180 may display the 3D view 32 while moving the viewpoint back and forth along the movement of the mobile terminal 100.

However, moving the mobile terminal 100 after application of a touch is merely exemplary, and aspects of the present invention are not limited thereto. Various types of touches, a combination thereof, or tilt/movement of a mobile terminal may be set as the various inputs for moving the view point, the various types of touches may include a short touch, a long touch, a multi-touch, a drag touch, a flick touch, a pinch-in touch, a pinch-out touch, a swipe touch, a hovering touch, and the like.

After step S350, steps from 310 to 345 may be applied.

Accordingly, as the search area matching with the area displayed in the form of the 3D view along the movement of the view point is displayed in the 2D map, the user can check the searched path, which was searched using the form of the 3D view, directly from the 2D map.

According to an example, the description provided with reference to FIG. 11 may be applied in the assumption that the 3D view is displayed in the first direction in step S120 shown in FIG. 3. However, aspects of the present invention are not limited thereto. According to another example, the description provided with reference to of FIG. 11 may be substantially and equally applied even in the case where the 3D view, not the 2D map, is first displayed.

Figure 17:
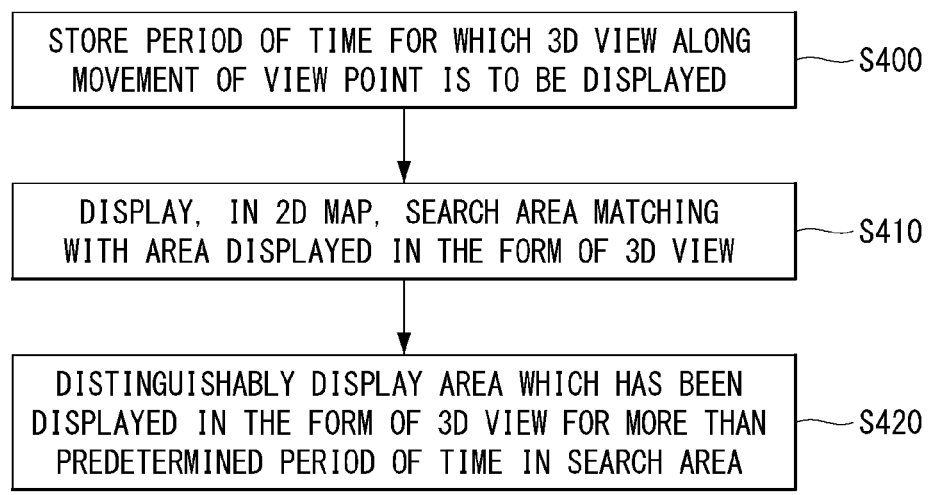
FIG. 17 is a flowchart of a method for controlling a mobile terminal according to an embodiment of the present invention, the mobile terminal which displays an area which has been displayed in the form of a 3D view for more than a predetermined period of time distinguishably from the rest part of a search area.
Figure 18:
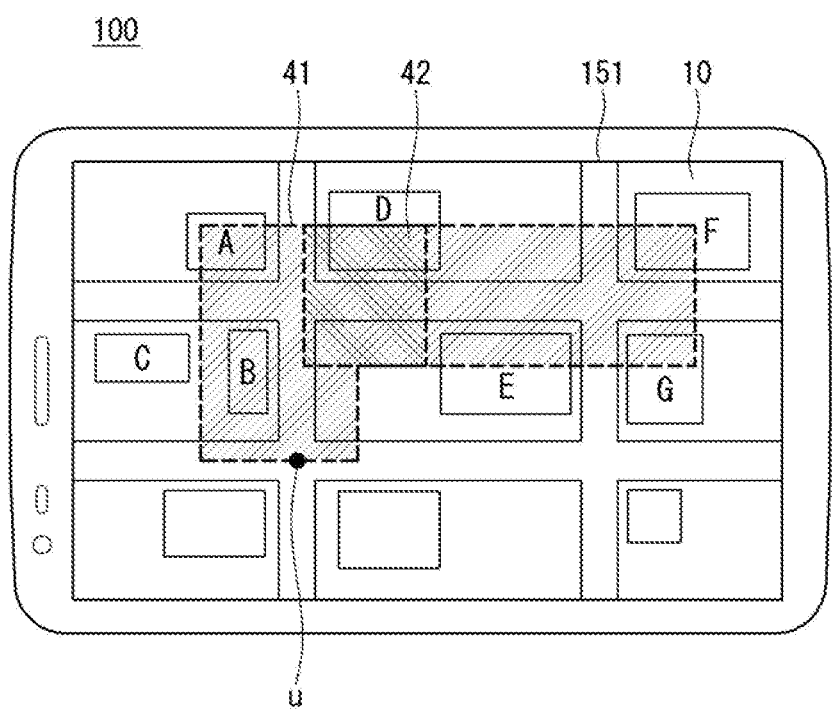
FIG. 18 is a diagram illustrating an example according to an embodiment of the present invention, the example in which an area which has been displayed in the form of a 3D view for more than a predetermined period of time is displayed distinguishably from the rest part of a search area.

FIG. 17 is a flowchart of a method for controlling a mobile terminal according to an embodiment of the present invention, the mobile terminal which distinguishably displays the search area, which has been displayed in the form of the 3D view for more than a predetermined period of time. FIG. 18 is a diagram illustrating an example according to an embodiment of the present invention, the example in which a search area which has been displayed in the form of a 3D view for more than a predetermined period of time is displayed distinguishably.

Referring to FIG. 17, the controller 180 may store a period of time for which the 3D view along the movement of the view point is to be displayed in S400. As described above with reference to FIG. 11, the controller 180 may display the 3D view along the movement of the view point. The control unit 180 may measure a period of time for which each area is displayed in a 3D view according to an input for moving a view point, and may store the measured period of time in the memory 170.

Referring to FIG. 17, the controller 180 may display, in the 2D map, a search area matching with the area displayed in the form of the 3D view in S410. FIG. 18 shows a case where the 2D map in which a search area 41 is displayed is displayed on the touch screen 151. Regarding this, the above descriptions about steps S325, S355, and S360 of FIG. 11 may be applied, and thus, detailed descriptions thereof are omitted.

Referring to FIG. 17, the controller 180 may distinguishably display an area 42 which has been displayed in the form of a 3D view for more than a predetermined period of time in the search area 41 displayed in the 2D map 10 in S420. The predetermined period of time is not limited to a specific period time, and it may be set differently.

As shown in FIG. 18, the controller 180 may display the area 42, which is part of the search area 41 and which has been displayed in the form of a 3D view for more than the predetermined period of time, distinguishably from other areas. According to an example, the area 42 may be displayed in different colors from the other areas. However, this is merely exemplary, and aspects of the present invention are not limited thereto. To distinguish the area 42 from other areas, a variety of effects, such as colors, shapes, symbols, and highlighting may be applied.

In FIG. 18, the area 42 is displayed in the same way as other areas, and aspects of the present invention are not limited thereto. According to an example, chroma, brightness, etc. of color of each portion of the area 42 may be adjusted in proportion to the period of time for which the area 42 has been displayed in the form of a 3D view. For example, the longer the period of time the area 42 has been displayed in the form of a 3D view, the higher the chroma or brightness of color is displayed.

According to another example, the controller 180 may not apply a limit of the predetermined time. In this case, chroma or brightness of color, etc. of each portion of the search area 41 may be adjusted in proportion to the period of time for which the area 42 was displayed in the 3D view.

In this manner, the area 42 is displayed, which is part of the search area 41 and which has been displayed in the form of a 3D view for more than a predetermined period of time, so that the user can intuitively recognize a mainly searched area in the area searched using a 3D view.

Figure 19:
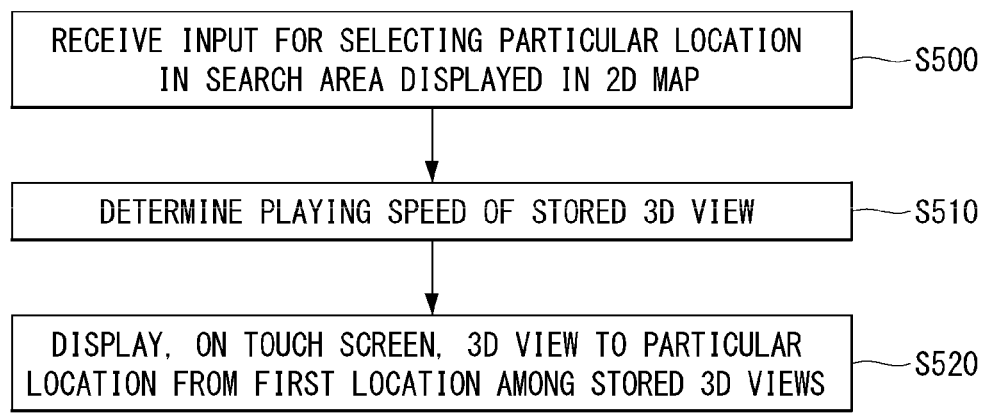
FIG. 19 is a flowchart of a method for controlling a mobile terminal according to an embodiment of the present invention, the mobile terminal which displays a 3D view to a particular location among stored 3D views.
Figure 20:
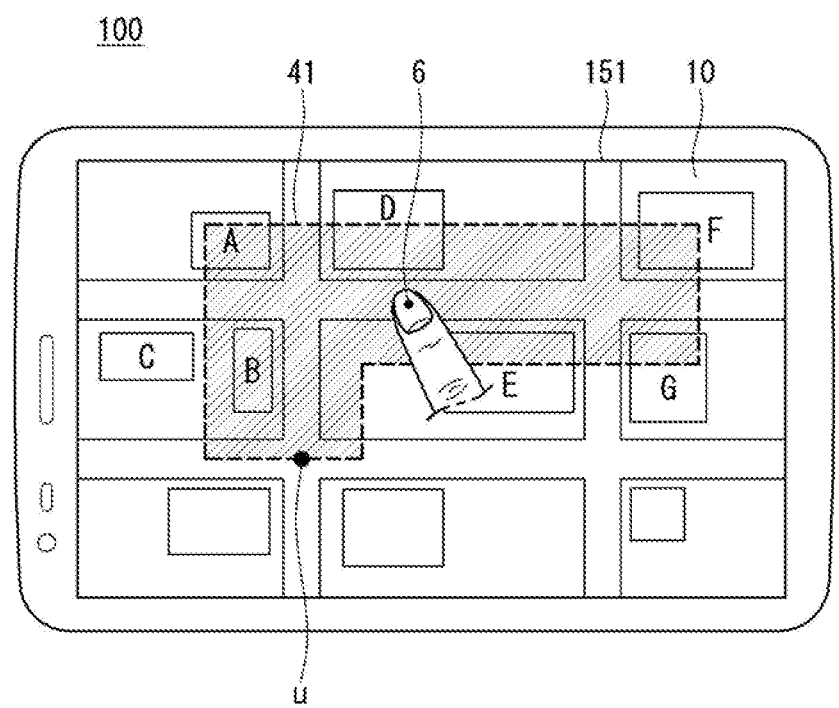
FIGS. 20 to 22 are diagrams illustrating an example according to an embodiment of the present invention, the example in which a 3D view to a particular location is displayed among stored 3D view according to an input for selecting a particular location in a search area.
Figure 21:
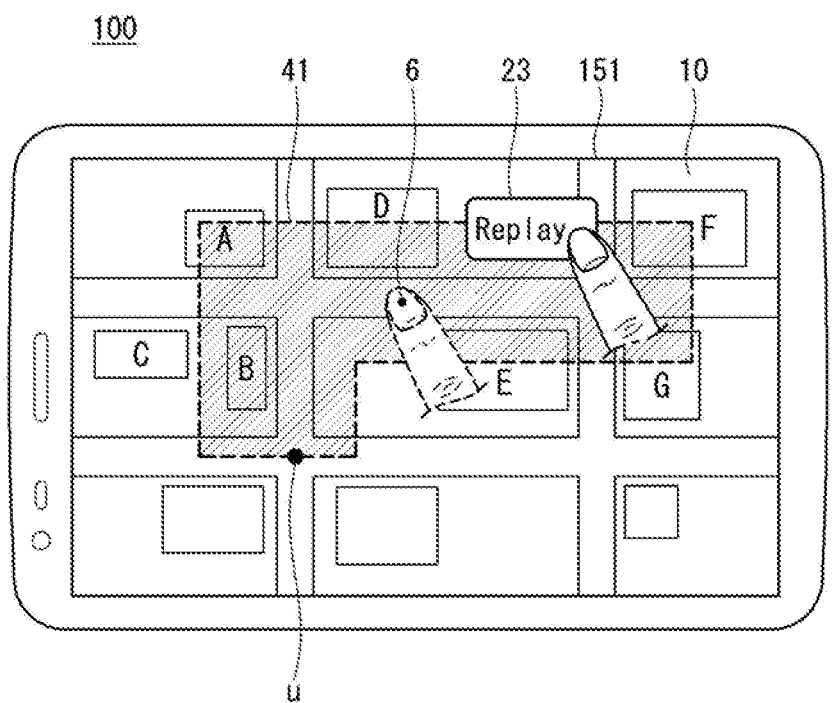
Figure 22:
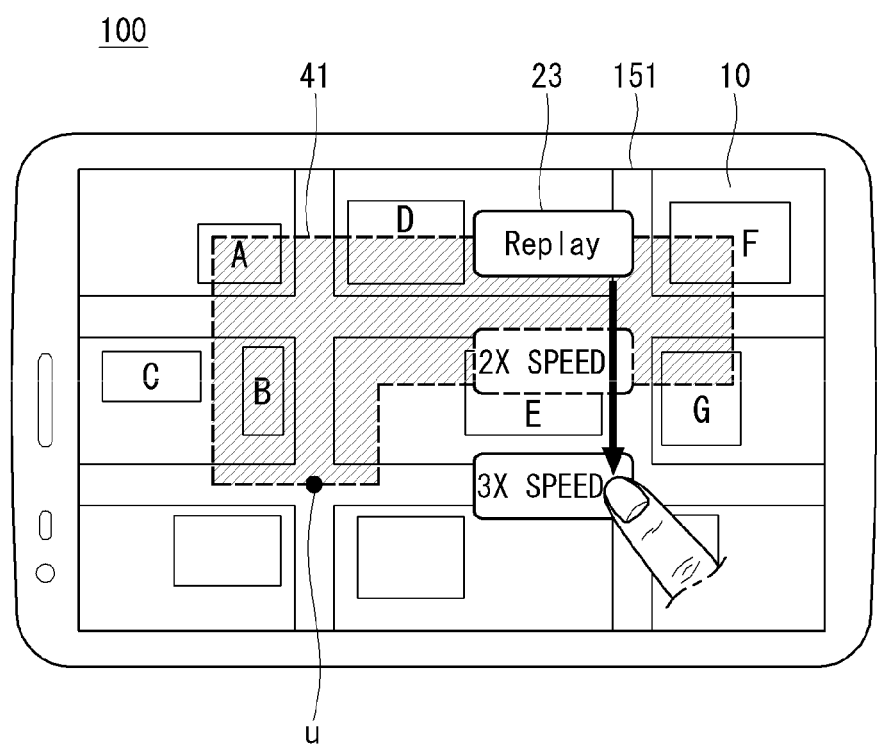

FIG. 19 is a flowchart of a method for controlling a mobile terminal according to an embodiment of the present invention, the mobile terminal which displays a 3D view to a particular location among stored 3D views. FIGS. 20 to 22 are diagrams illustrating an example according to an embodiment of the present invention, the example in which a 3D view to a particular location is displayed among stored 3D views according to an input for selecting the particular location in a search area.

Referring to FIG. 19, the controller 180 may receive an input for selecting a particular location in the search area displayed in the 2D map in S500. FIG. 20 shows a case where a 2D map in which the search area 41 is displayed in the assumption that the 3D view from the first location 2 to the second location 5 is displayed, as described above with reference to FIG. 12. In addition, as described above, the 3D view matching with the search area 41 may be stored in the memory 170.

The user may apply a predetermined touch input to a particular location 6 in order to check again a 3D view from the first location 2 to the particular location 6. The predetermined touch input may be set to be various types of touches or a combination thereof, and the various types of touches may include a short touch, a long touch, a multi-touch, a drag touch, a flick touch, a pinch-in touch, a pinch-out touch, a swipe touch, a hovering touch, and the like.

Referring again to FIG. 19, the controller 180 may determine a playing speed of the stored 3D views in S510. The controller 180 may display, on the touch screen 151, a 3D view from the first location to the particular location among the stored 3D views in S520.

In response to reception of the predetermined touch input, the controller 180 may display a menu 23 for playing the 3D view to the particular location 6 among the stored 3D views, as shown in FIG. 21. The shape and location of the menu 23 shown in FIG. 21 are merely exemplary, and aspects of the present invention are not limited thereto. The shape and location of the menu 23 maybe set differently. In addition, according to an example, the controller 180 may display another menu, such as a sharing menu, in addition to the menu 23 for playing the 3D view.

As shown in FIG. 22, the user may select the menu 23 and then drag the menu 23 in one direction in order to set a playing speed. The controller 180 may display a stored playing speed menu of the 3D view in proportion to the distance by which the menu 23 has been dragged. If the user selects the menu 23 and then does not drag the menu 23, an original playing speed may be set as the playing speed.

According to another embodiment, in response to reception of the predetermined touch input, the controller 180 may play a 3D view to the particular location 6 without displaying the menu 23. In this case, the controller 180 may set the playing speed in proportion to a drag input applied after the predetermined touch input. Alternatively, the controller 180 may play the 3D view at a preset playing speed.

According to an example, the controller 180 may play the stored 3D view by reflecting an actual period of time for which a view point has been moved to the particular location 6. According to another example, the controller 180 may playback the stored 3D view in the assumption that the view point has been moved to the particular location 6 at a constant speed.

According to an example, the controller 180 may omit an area which has been redundantly searched in the stored 3D views, and may display a 3D view from the first location 2 to the particular location 6.

In this manner, a 3D view to a particular location in the stored 3D view is displayed according to the input for selecting the particular location in the search area, and thus, a user can easily check a desired area in the search area.

Figure 23:
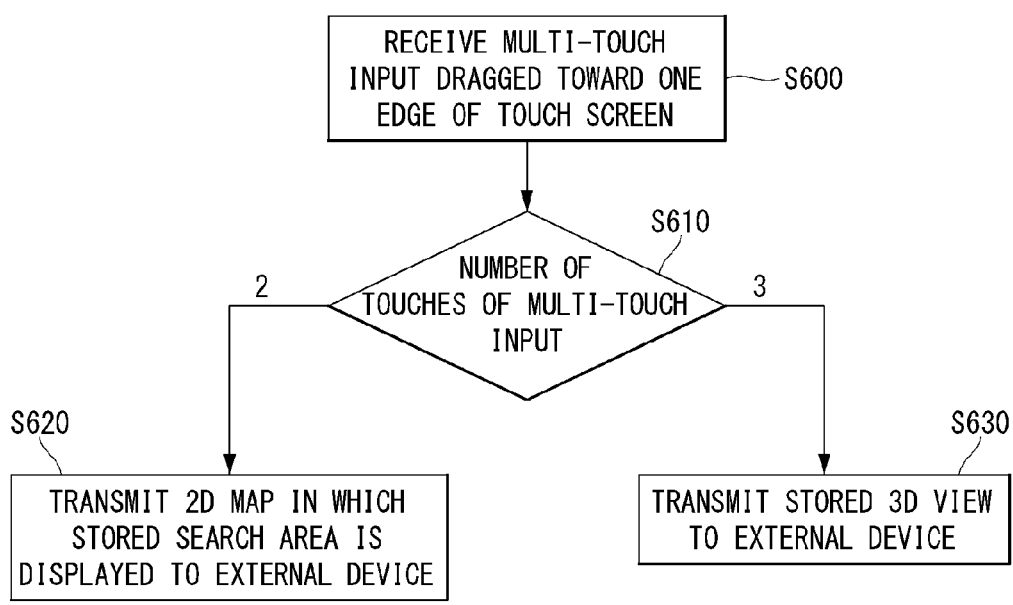
FIG. 23 is a flowchart of a method for controlling a mobile terminal according to an embodiment of the present invention, the mobile terminal which transmits a stored 3D view or a 2D map to an external device according to a multi-touch input.
Figure 24:
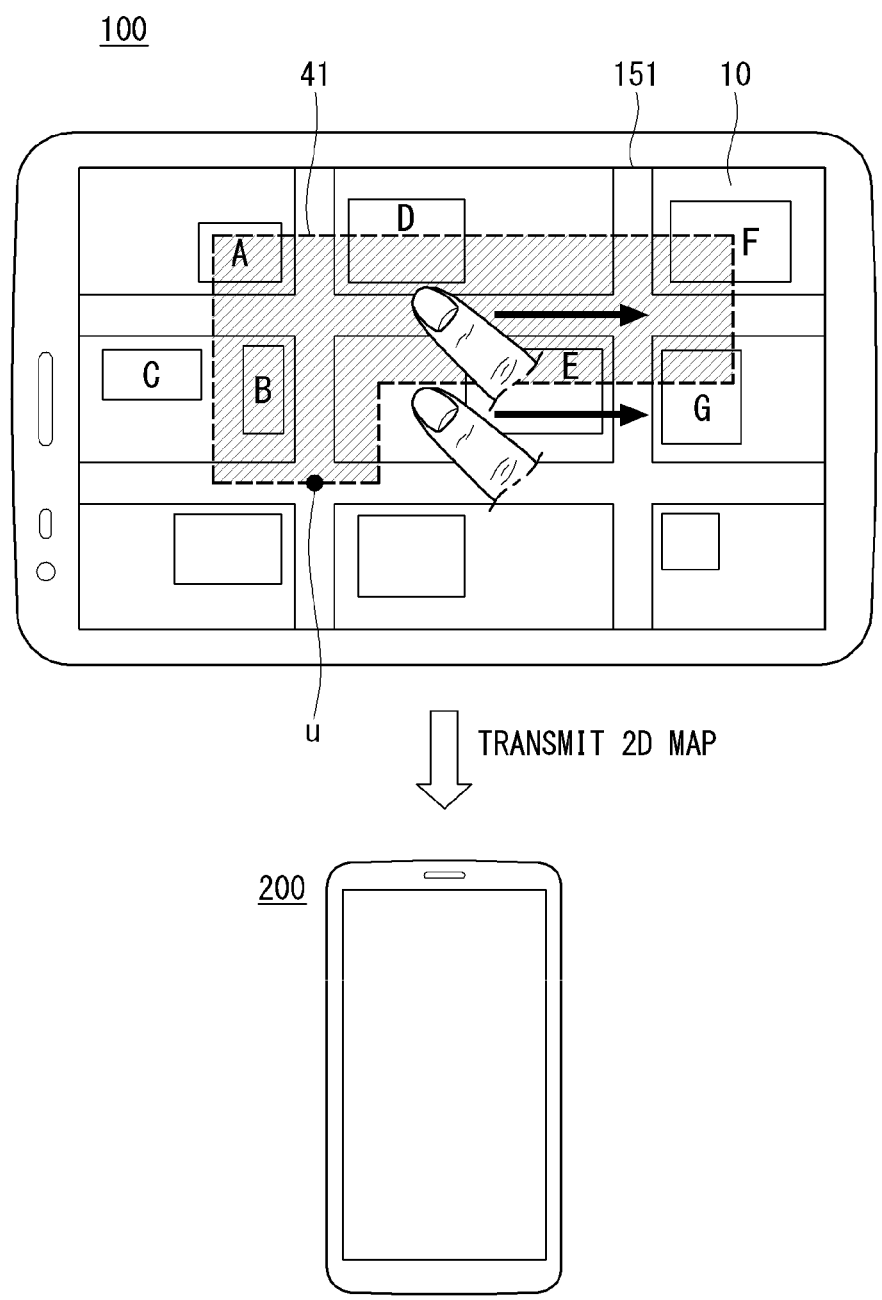
FIGS. 24 and 25 are diagrams illustrating an example according to an embodiment of the present invention, the example in which a stored 3D view or a 2D map is transmitted to an external device according to a multi-touch input.
Figure 25:
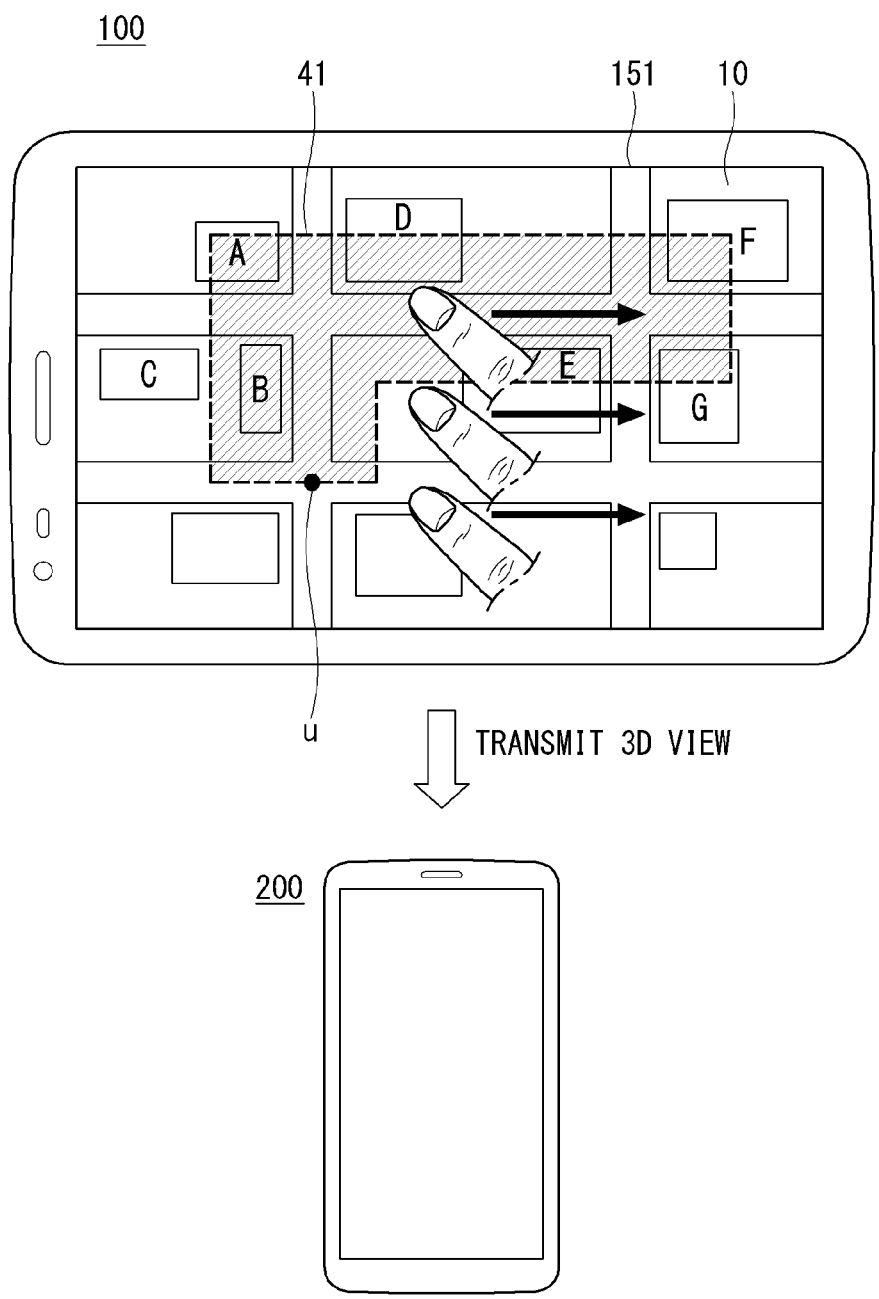

FIG. 23 is a flowchart of a method for controlling a mobile terminal according to an embodiment of the present invention, the mobile terminal which transmits a stored 3D view or a 2D map to an external device according to a multi-touch input. FIGS. 24 and 25 are diagrams illustrating an example according to an embodiment of the present invention, the example in which a stored 3D view or a 2D map is transmitted to an external device according to a multi-touch input.

Referring to FIG. 23, the controller 180 may receive a drag input toward one edge of the touch screen 151 after a multi-touch in S600. FIG. 24 shows a case where a 2D map 10 in which the search area 41 is displayed is displayed in the assumption that a 3D view is displayed from the first location 2 to the second location 5, as described above in FIG. 12. In addition, as described above, the 3D view matching with the search area 41 and the 2D map 10 in which the search area 41 is displayed may be stored in the memory 170.

According to an example, as shown in FIG. 24, the user may apply a multi-touch input with two fingers in order to transmit the 2D map 10 in which the stored search area is displayed. According to another example, as shown in FIG. 25, the user may apply a multi-touch input with three fingers in order to transmit the stored 3D view.

The user may drag the multi-touch input toward one edge of the touch screen 151. However, this is merely exemplary, and aspects of the present invention are not limited thereto. The touch input for transmitting the stored 3D view or the 2D map 10 in which the stored search area is displayed may be set differently, if necessary.

Referring to FIG. 23, the controller 180 may check the number of touches of the multi-touch input in S610, and transmit one of the stored 3D view or the 2D map 10, in which the stored search area is displayed, to the external device 200 through the wireless communication unit 110 according to the number of touches of the multi-touch input in S620 ad S630. According to an example, communication to the external device 200 may be established in advance through the wireless communication unit 110.

According to another example, the controller 180 may obtain a direction of the drag input. The controller 180 may transmit the stored 3D view or the 2D map 10, in which the stored search area is displayed, to an external device 200 located in a direction that matches the direction of the drag input. To this end, the controller 180 may obtain information on a location of the external device 200 in the vicinity of the mobile terminal 100. A method for determining a location of an external device in a short-range communication scheme complies with a well-known technique, and thus, detailed description thereof is omitted.

Accordingly, the stored 3D view or the 2D map is transmitted to the external device according to the multi-touch input, so that the user can easily share the stored search area.

Figure 26:
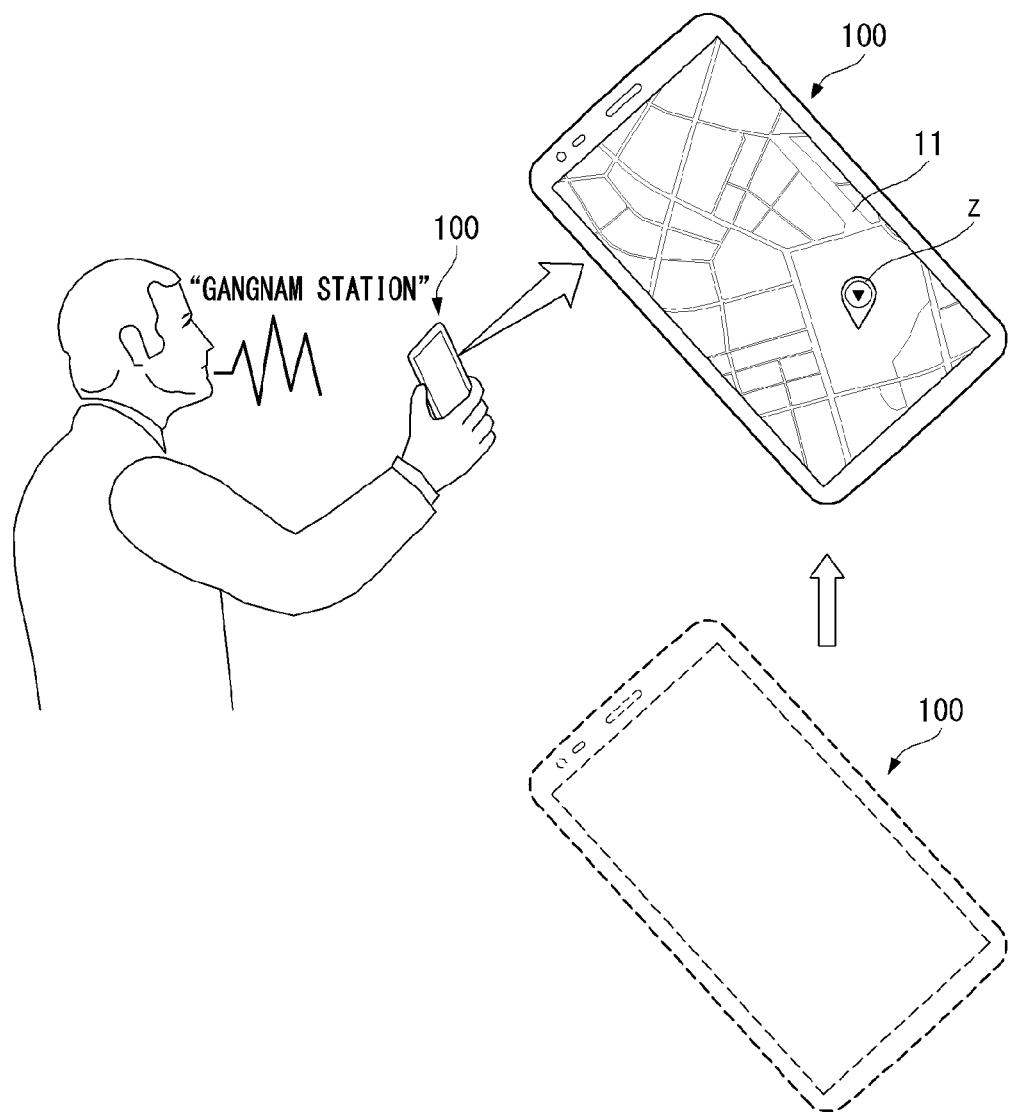
FIGS. 26 and 27 are diagrams illustrating an example according to an embodiment of the present invention, the example in which a 2D map or a 3D view is displayed according to a voice of a user or tilt of a mobile terminal.
Figure 27:
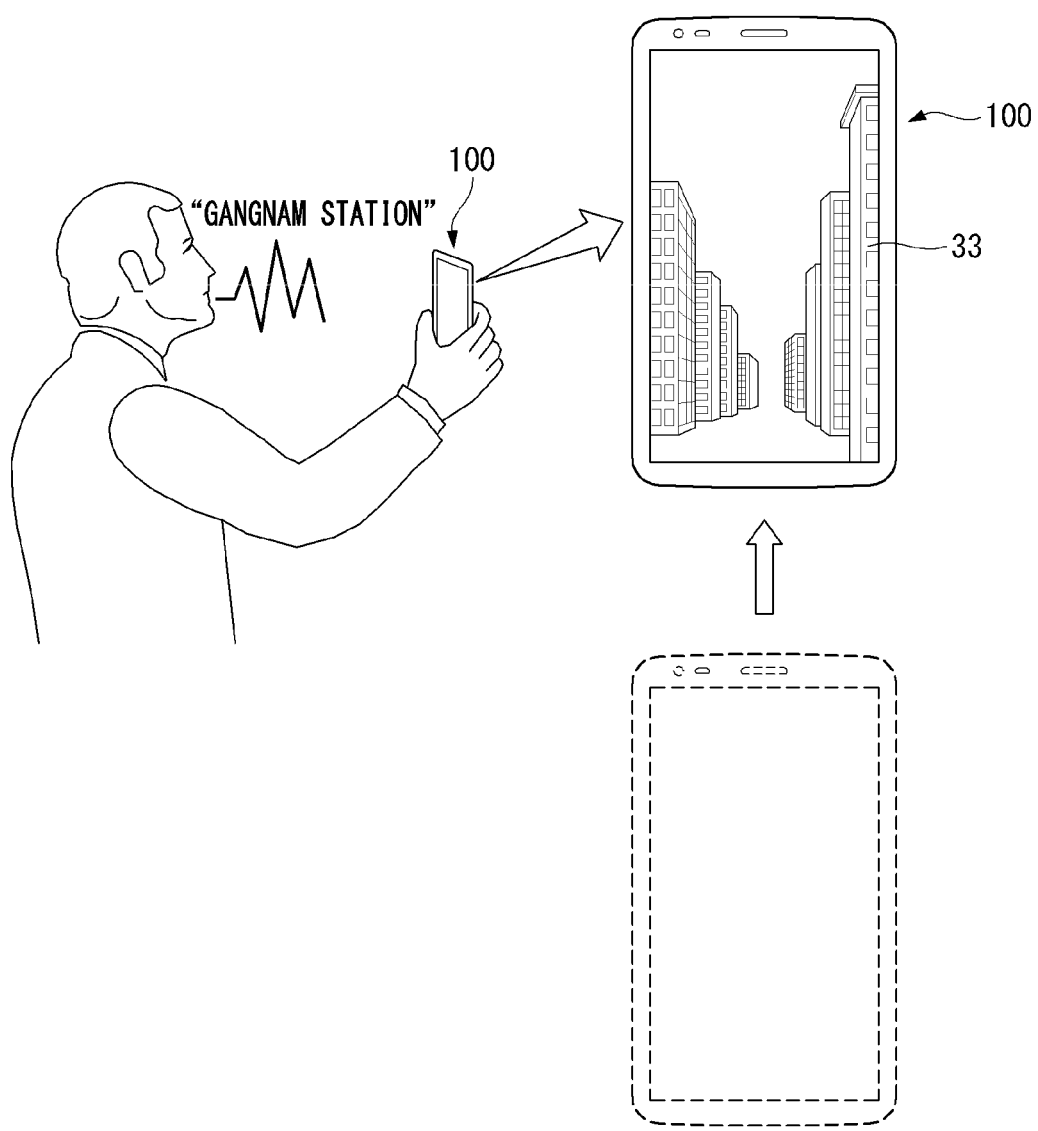

FIGS. 26 and 27 are diagrams illustrating an example according to an embodiment of the present invention, the example in which a 2D map or a 3D view is displayed according to a voice of a user or tilt of a mobile terminal.

The controller 180 may display the 2D map or the 3D view on the touch screen 151 based on an audio signal, which is input through a microphone 122, or based on tilt or movement of the mobile terminal 100 sensed by the sensing unit 140.

Referring to FIG. 26, the user may speak a word related to a specific place while moving the mobile terminal 100 upward. The controller 180 may identify the specific place on the basis of the word input through the microphone 122. The controller 180 can read map data corresponding to the identified specific place from the memory 170.

The sensing unit 140 may sense the movement of the mobile terminal 100 which is moved upward by the user. In addition, the sensing unit 140 may sense tilt of the mobile terminal 100, when the user is moving the mobile terminal upward. The controller 180 may receive information on the tilt and the movement of the mobile terminal 100 sensed by the sensing section 140.

According to an example, when the controller 180 determines that the mobile terminal 100 is moving upward in a tilted state, as shown in FIG. 26, the controller 180 may display a 2D map 11 including the specific place on the touch screen 151. The controller 180 may display a location z corresponding to the specific place in the 2D map 11. Although not shown in FIG. 26, the controller 180 may also display a location of the user in the 2D map 11.

According to another example, when it is determined that the mobile terminal 100 moves upward in an erected upright state, the controller 180 may display a 3D view 33 of the specific place on the touch screen 151, as shown in FIG. 27. According to an example, a direction in which the 3D view 33 is displayed from the view point of the specific place may be set as a virtual straight line direction perpendicular to the touch screen 151. However, it is merely exemplary. The direction in which the 3D view 33 is displayed may be set differently.

Accordingly, the 2D map or the 3D view is displayed according to the voice or the tilt of the mobile terminal, so that the user can easily check the 2D map or the 3D view.

Figure 28:
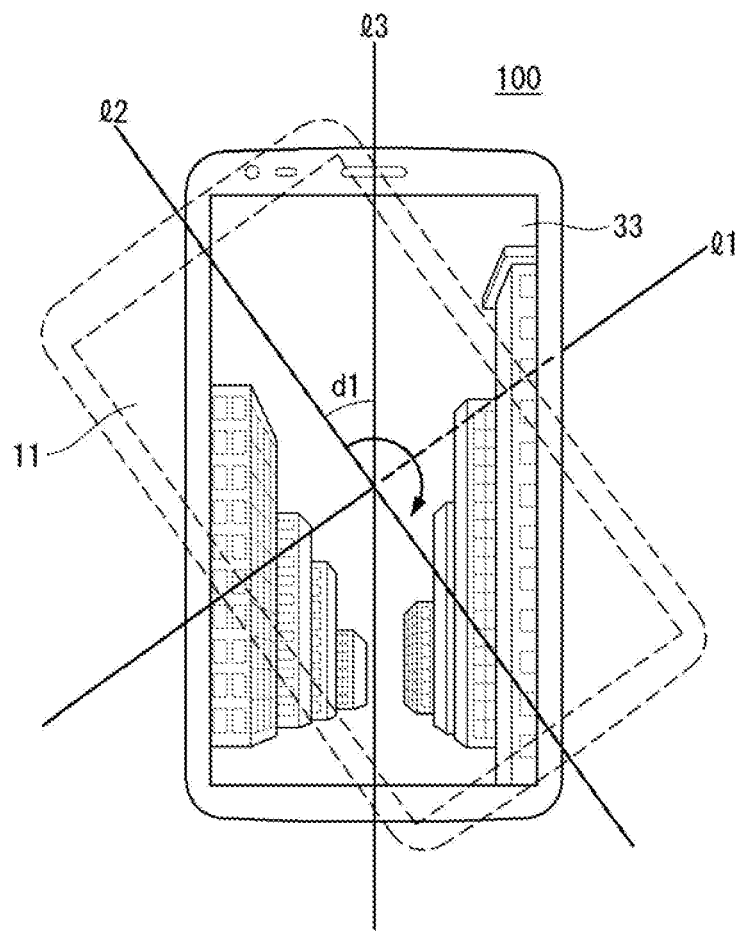
FIGS. 28 and 29 are diagrams illustrating an example according to an embodiment of the present invention, the example in which a 2D map and a 3D view is displayed according to tilt caused by rotation of a mobile terminal.
Figure 29:
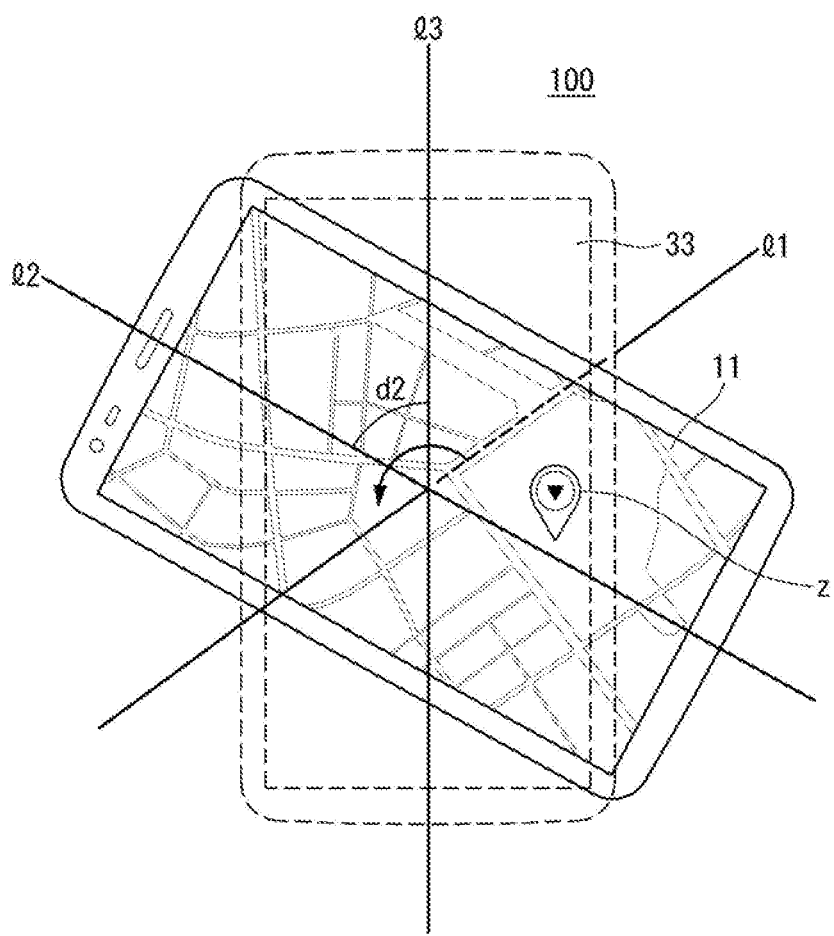

FIGS. 28 and 29 are diagrams illustrating an example according to an embodiment of the present invention, the example in which a 2D map is converted into a 3D view, and vice versa, according to tilt caused by rotation of a mobile terminal.

FIG. 28 shows a case where a mobile terminal 100 in an erect upright state is floating above the ground surface. For convenience of explanation, it is assumed that a virtual straight line 11 is perpendicular to the touch screen 151, that a virtual straight line 12 is in the same plane as the touch screen 151 and perpendicular to the top edge of the touch screen 151, and that a virtual straight line 13 is perpendicular to the ground surface.

Referring to FIG. 28, the controller 180 may sense the tilt caused by rotation of the mobile terminal 100 with respect to the virtual straight line 11. A method of measuring the tilt of the mobile terminal 100 from the sensing unit 140 complies with a well-known method, and thus, specific description thereof is omitted.

According to an example, a tilt value used as a criterion for determining whether to convert the 2D map 11 into the 3D view 33 may be predetermined. According to an example, the predetermined tilt value may be set to an angle d1 between the virtual straight line 12 and the virtual straight line 13. The angle d1 is shown on the left side of the virtual straight line 13 in FIG. 28 for convenience of explanation, but it is obvious that the angle d1 is not limited to being located in a particular direction.

It is assumed that a user checks the 2D map 11 while holding the mobile terminal 100 in the horizontal viewing. The user may rotate the mobile terminal 100 vertically in order to check the 3D view 33. When the tilt of the mobile terminal 100 is smaller than the predetermined tilt value, that is, when the angle between the virtual straight lines 12 and 13 is smaller than d1, the controller 180 may convert the 2D map 11 into the 3D view 33.

According to another example, referring to FIG. 29, a tilt value used a criterion for determining whether to convert the 3D view 33 into the 2D map 11 may be predetermined. According to an example, the predetermined tilt value may be set as an angle d2 between the virtual straight line 12 and the virtual straight line 13.

It is assumed that a user checks the 3D view 33 while holding the mobile terminal 100 in the vertical viewing. The user may rotate the mobile terminal 100 horizontally in order to check the 2D map 11. When the tilt of the mobile terminal 100 is greater than the predetermined tilt value, that is, when the angle between the virtual straight lines 12 and 13 is larger than d2, the controller 180 may convert the 3D view 33 into the 2D map 11.

According to an example, the angle d1 and the angle d2 may be set to be identical to each other. Alternatively, the angle d2 may be greater than the angle d1. When the angle d2 is set to be greater than the angle d1, the 3D view 33 or the 2D map 11 which is now being displayed may be prevented from being converted in accordance with shaking of the mobile terminal 100.

According to an example, when the mobile terminal 100 placed vertically is rotated to the angle d2, the controller 180 may increase, in proportion to the rotation angle, a distance by which the 3D view 33 is displayed. It may be implemented in the manner of increasing the height of the view point while maintaining a gaze direction can be implemented, when the 3D view is displayed. Alternatively, it may be implemented in the manner of increasing the gaze direction while fixing the height of the view point.

When the mobile terminal 100 is rotated back to the vertical orientation before the mobile terminal 100 is more tilted than the angle d2, the controller 180 may decrease, in proportion to the rotation angle, a distance by which the 3D view 33 is displayed. It may be implemented in the manner of decreasing the height of the view point while maintaining a gaze direction, when the 3D view is displayed. Alternatively, it may be implemented in the manner of decreasing the gaze direction while fixing the height of the view point.

Accordingly, the user can easily perform conversion of the 2D map or the 3D view by converting the 2D map into the 3D view, or vice versa, according to the tilt caused by rotation of the mobile terminal.

Figure 30:
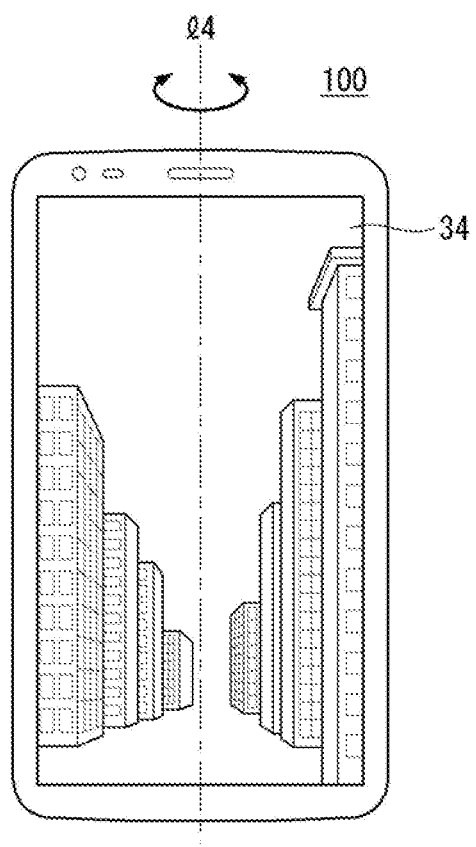
FIGS. 30 to 32 are diagrams illustrating an example according to an embodiment of the present invention, the example in which a direction in which a 3D view is displayed is rotated based on sensed rotation of a mobile terminal.
Figure 31:
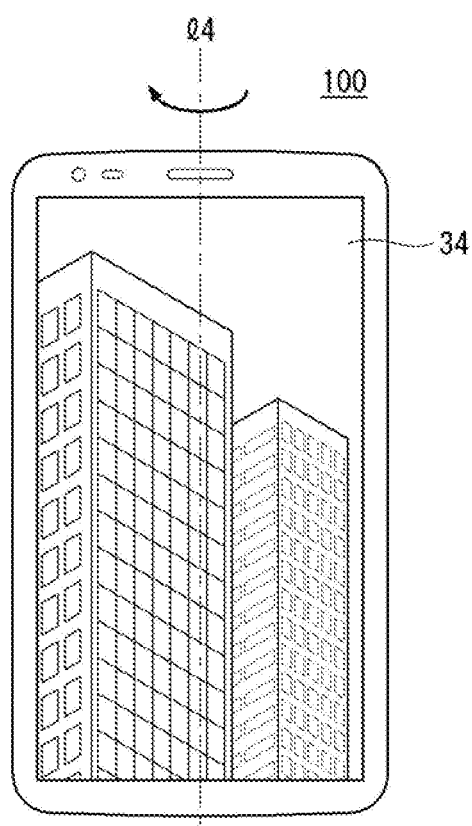
Figure 32:
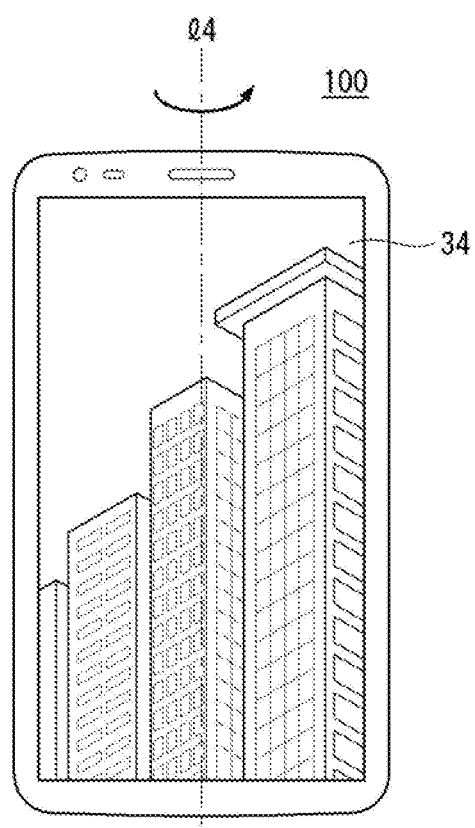

FIGS. 30 to 32 are diagrams illustrating an example according to an embodiment of the present invention, the example in which a 3D view is displayed based on sensed rotation of a mobile terminal.

FIG. 30 shows a case where a mobile terminal 100 in an erected upright state is floating above the ground surface. For convenience of explanation, it is assumed that a virtual straight line 14 is in the same plane as the touch screen 151 and perpendicular to the ground surface.

Referring to FIG. 30, the sensing unit 140 may sense rotation of the mobile terminal 100 with respect to the virtual straight line 14. The controller 180 may rotate the first direction, in which the 3D view 34 is displayed, based on the rotation of the mobile terminal 100.

For example, it is assumed that a user rotates the mobile terminal 100 to the left with respect to the virtual straight line 14. as shown in FIG. 31. The controller 180 may move the first direction to the left according to the rotation of the mobile terminal 100. Accordingly, as shown in FIG. 31, a 3D view of the left side area of the 3D view 34 shown in FIG. 30 may be displayed on the touch screen 151.

Similarly, it is assumed that a user rotates the mobile terminal 100 to the right with respect to the virtual straight line 14, as shown in FIG. 32. The controller 180 may move the first direction to the right according to the rotation of the mobile terminal 100. Accordingly, as shown in FIG. 32, a 3D view of the right side area of the 3D view 34 shown in FIG. 30 may be displayed on the touch screen 151.

According to an example, moving the first direction according to the rotation of the mobile terminal 100, may be substantially equally applied to even the case of displaying the 3D view along the movement of the view point, as previously described with reference to FIG. 11. In this case, the direction of the movement of the view point may be changed according to the movement in the first direction.

Accordingly, a direction in which the 3D view is displayed is rotated based on sensed rotation of a mobile terminal, so that the user can easily change the direction.

Figure 33:
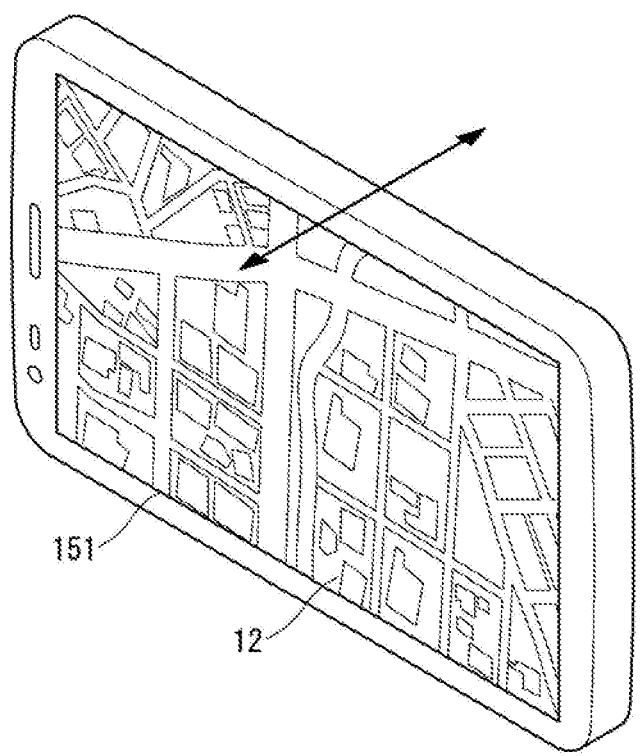
FIGS. 33 to 35 are diagrams illustrating an example terminal according to an embodiment of the present invention, the example in which a scale of a 2D map or a 3D view is changed according to forward or backward movement of a mobile terminal.
Figure 34:
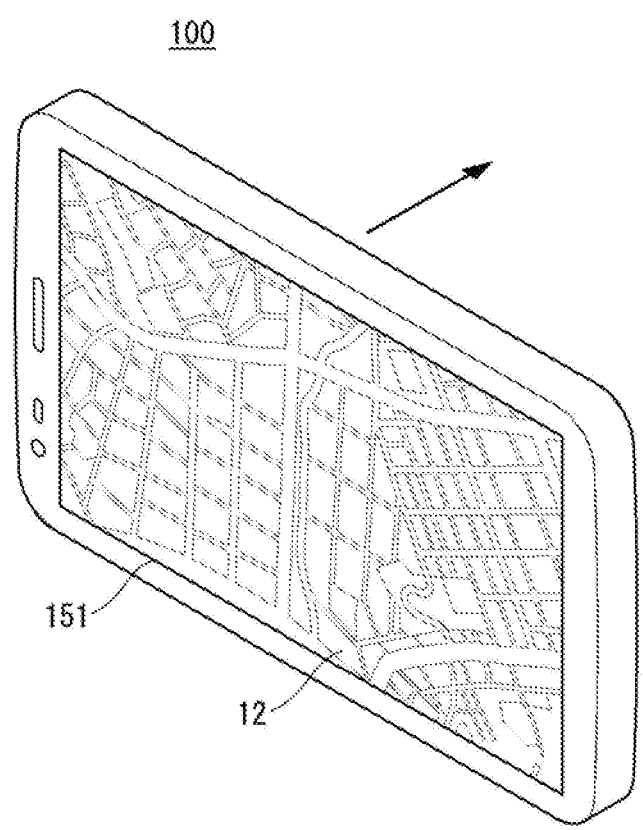
Figure 35:
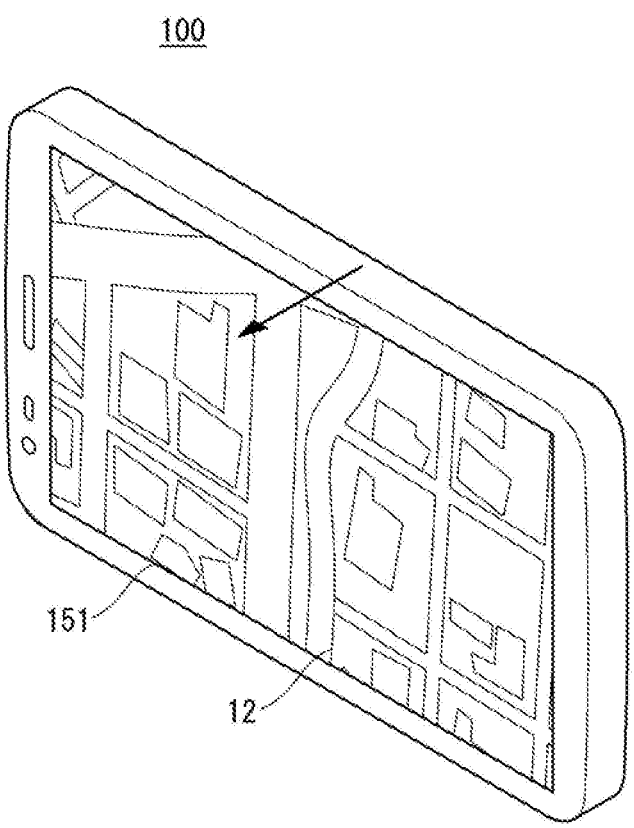

FIGS. 33 to 35 are diagrams illustrating an example according to an embodiment of the present invention, the example in which a scale of a 2D map or a 3D view is changed along forward or backward movement of a mobile terminal.

FIG. 33 shows a case where the mobile terminal 100 is floating above the ground surface. The 2D map 12 is displayed on the touch screen 151. The sensing unit 140 may sense forward or backward movement of the mobile terminal 100. The controller 180 may change a scale of the 2D map 12 displayed on the touch screen 151 according to the movement of the mobile terminal 100.

For example, it is assumed that a user moves the mobile terminal 100 forward, as shown in FIG. 34. The controller 180 may reduce the scale of the 2D map 12 according to the movement of the mobile terminal 100. Accordingly, a 2D map 12 of an area larger than that of the 2D map 12 shown in FIG. 33 may be displayed on the touch screen 151, as shown in FIG. 34.

Similarly, it is assumed that a user moves the mobile terminal 100 backward, as shown in FIG. 35. The controller 180 may increase a scale of the 2D map 12 according to the movement of the mobile terminal 100. Accordingly, a 2D map 12 for an area smaller than that displayed in the 2D map 12 shown in FIG. 33 may be displayed on the touch screen 151, as shown in FIG. 35.

The above description is based on the assumption that the 2D map 12 is displayed on the touch screen 151, but aspects of the present invention are not limited thereto. Even in the case where the 3D view is displayed on the touch screen 151, the above description may be substantially equally applied. That is, when the mobile terminal 100 is moving forward, the 3D view may be displayed to a farther distance. In contrast, when the mobile terminal 100 is moving to backward direction, the 3D view may be displayed to a closer distance.

According to this, the user can conveniently change the scale of the 2D map or the 3D view by changing the scale of the 2D map or the 3D view according to forward or backward movement of the mobile terminal.

FIGS. 36 to 39 are diagrams illustrating an example according to an embodiment of the present invention, the example in which a 2D map and a 3D view are displayed together according to a predetermined touch input.

Figure 36:
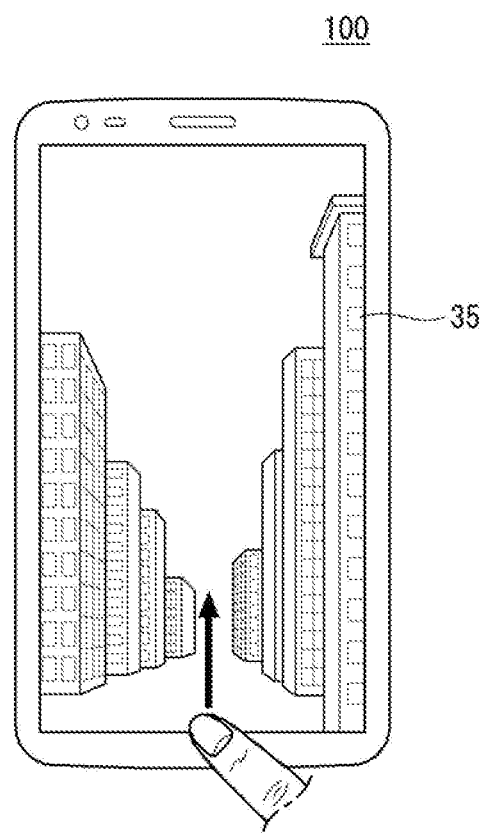
FIGS. 36 to 39 are diagrams illustrating an example according to an embodiment of the present invention, the example in which a 2D map and a 3D view are displayed together according to a predetermined touch input.
Figure 37:
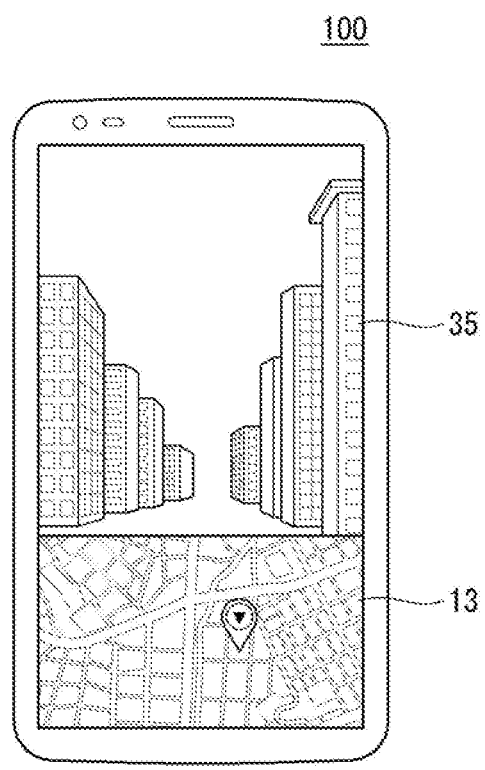

Referring to FIG. 36, a 3D view 35 is displayed on the touch screen 151. A user can drag a finger toward the center from one edge of the touch screen 151 in order to compare the 3D view 35 with the 2D map. In response to the drag input, the controller 180 may reduce an area in which the 3D view 35 is displayed according to the drag input, as shown in FIG. 37. According to an example, the area displayed in the form of the 3D view 35 may be reduced gradually according to the progress of the drag input.

In addition, the controller 180 may display the 2D map 13 in other area of the touch screen 151 in response to the drag input, as shown in FIG. 37. The 2D map 13 may include an area displayed in the form of the 3D view 35. According to an example, the area in which 2D map 13 is displayed may be increased gradually according to the progress of the drag input.

A touch input is dragged from the bottom edge of the touch screen 151 in FIG. 36, but aspects of the present invention are not limited thereto. According to another example, the foregoing can be substantially equally applied to an input that is dragged from any other edge of the touch screen 151.

The above description is based on the assumption that the 3D view 35 is displayed on the touch panel 151, but aspects of the present invention are not limited thereto. The foregoing can be substantially equally applied to a case where the 2D map 13 is displayed in the touch panel 151.

Figure 38:
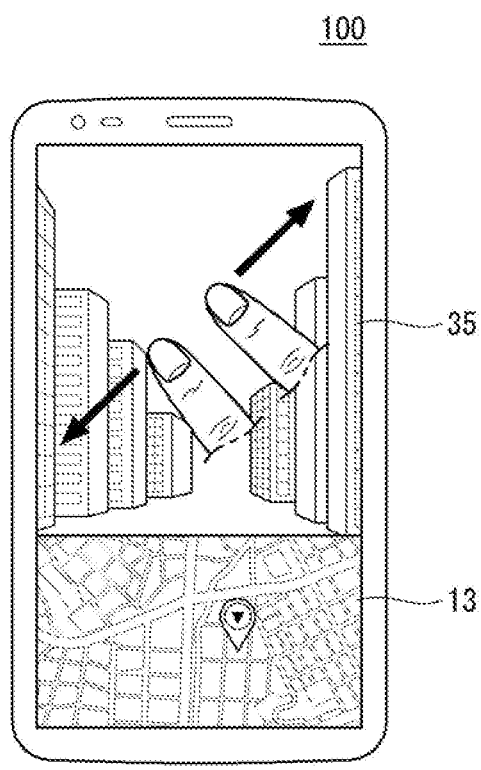

Referring to FIG. 38, when a pinch out input is received in an area in which the 3D view 35 is displayed, the control unit 180 may enlarge the 3D view 35. When the pinch-out input is received in an area in which the 2D map 13 is displayed, the control unit 180 may enlarge the 2D map 13.

Similarly, when a pinch-in input is received in an area in which the 3D view 35 is displayed, the control unit 180 may reduce the 3D view 35. When the pinch-in input is received in an area in which the 2D map 13 is displayed, the control unit 180 may reduce the 2D map 13.

Figure 39:
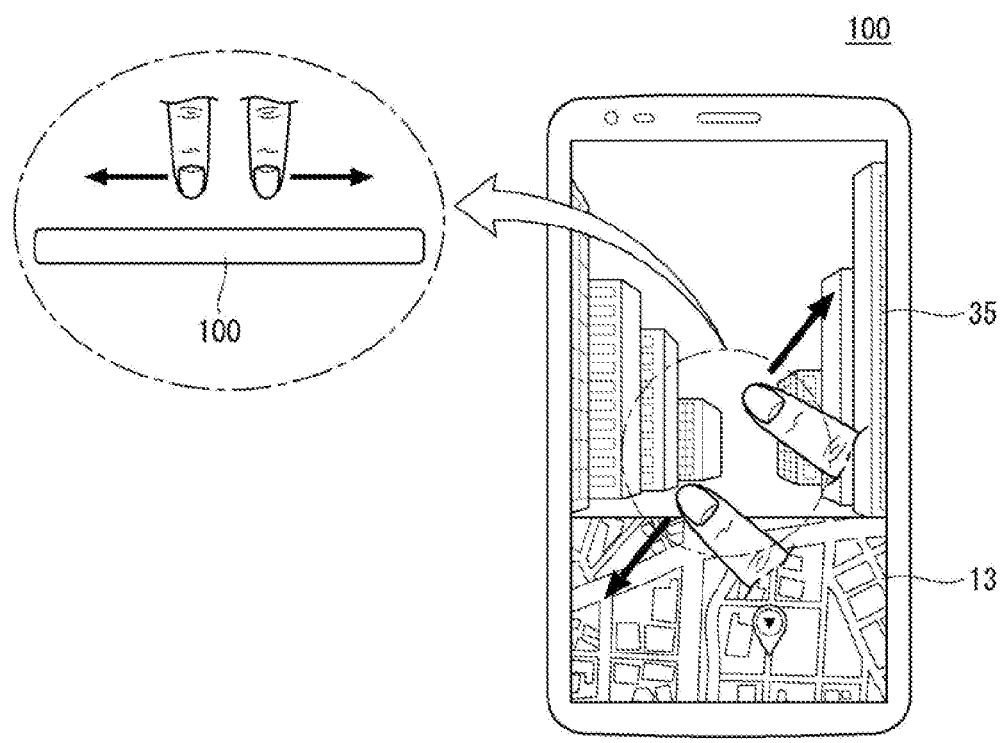

Referring to FIG. 39, the controller 180 may receive a proximity pinch-out touch input in one area of the touch screen 151. As shown in FIG. 39, the control unit 180 may enlarge the 3D view 35 and the 2D map 13 at the same time in response to the proximity pinch-out touch input. Similarly, in response to reception of a proximity pinch-in touch input in one area of the touch screen 151, the control unit 180 may reduce the 3D view 35 and the 2D map 13 at the same time.

The pinch-in/out input is as an example of a touch input for controlling displaying the 3D view 35 and the 2D map 13 according to a contact touch or a proximity touch, but aspects of the present invention are not limited thereto. Controlling displaying either or both of the 3D view 35 and the 2D map 13 at the same time in response to the contact touch or the proximity touch may be applied to a variety of touch input. For example, the foregoing can be substantially equally applied even to the case of a drag input for moving an area displayed in the form of the 3D view 35 or the 2D map 13.

According to an example, a user may select a particular location in an area in which the 2D map 13 is displayed. The controller 180 may change the 3D view 35 into a 3D view of the particular location. Alternatively, the controller 180 may display a path to the particular location in the 2D map 13, and update the 3D view 35 while moving the viewpoint along the path to the particular location.

According to an example, in the case where a predetermined input is received when which the 3D view 35 is being displayed, the controller 180 may display a pop-up window, in which the 2D map 13 is displayed, in one area of the touch screen 151. Alternatively, in the case where a predetermined input is received when the 2D map 13 is being displayed, the controller 180 may display a pop-up window, in which the 3D view 35 is displayed, in one area of the touch screen 151.

Accordingly, the 2D map and the 3D view are displayed together according to a predetermined touch input, a user can easily check an area displayed in the form of the 3D view from the 2D map. In addition, as the 3D view and the 2D map are displayed at the same time on the same screen, the user can select easily an area displayed in the form of the 3D view from the 2D map.

Figure 40:
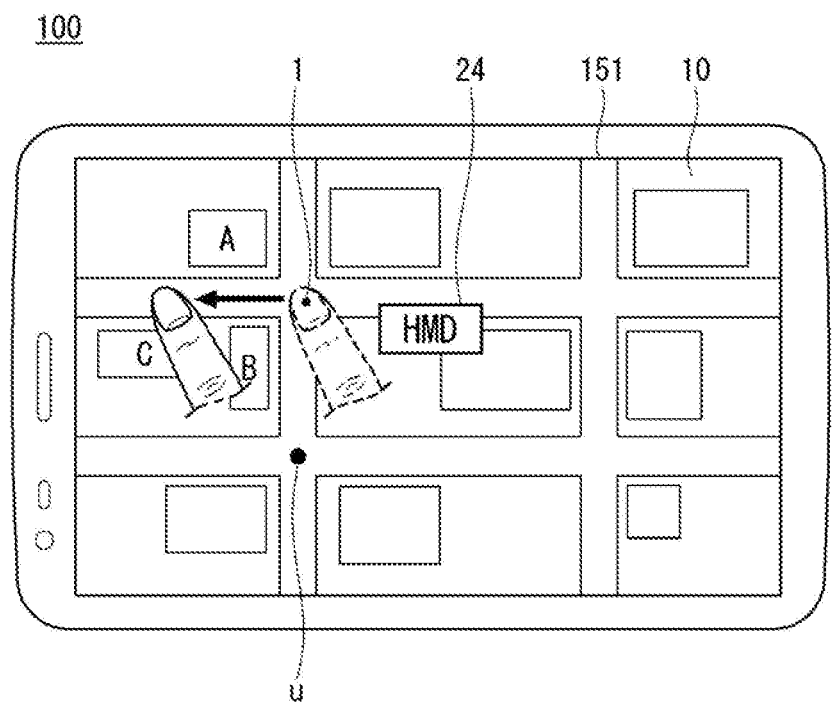
FIGS. 40 and 41 are diagrams illustrating an example according to an embodiment of the present invention, the example in which a signal for displaying a 3D view to a glasses-type mobile terminal is transmitted.
Figure 41:
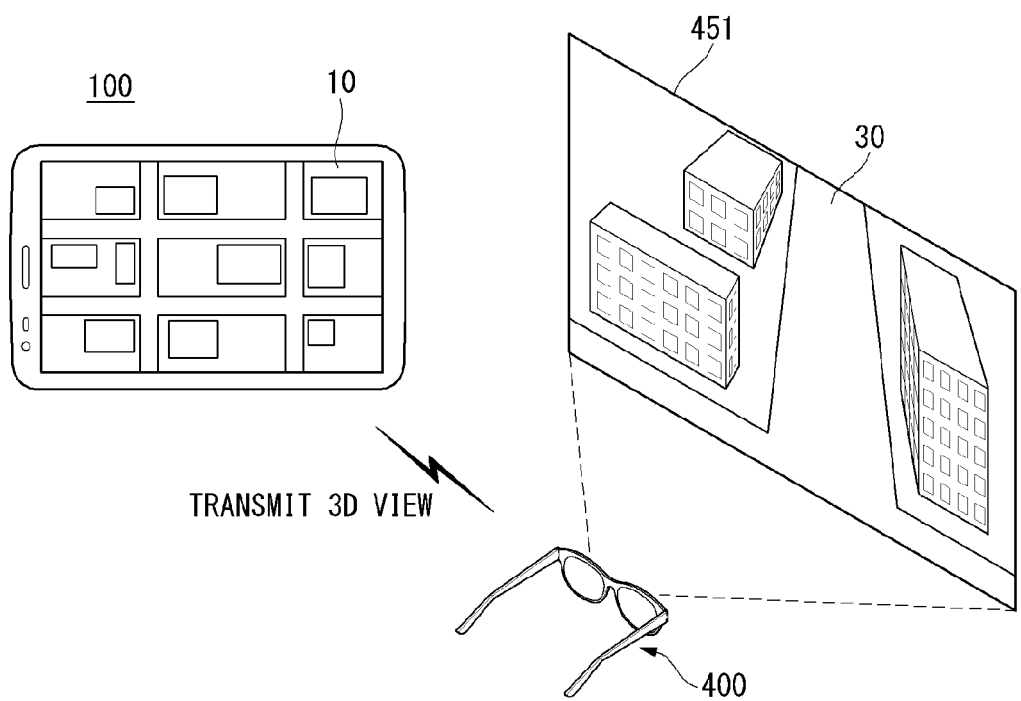

FIGS. 40 and 41 are diagrams illustrating an example according to an embodiment of the present invention, the example in which a signal for displaying a 3D view is transmitted to a glasses-type mobile terminal.

According to an example, it is assumed that a user of the mobile terminal 100 wears a glasses-type mobile terminal 400. The control unit 180 may establish communication with the glasses-type mobile terminal 400 through the wireless communication unit 110. Communication connection between the mobile terminal 100 and the glasses-type mobile terminal 400 complies with a well-known method, and thus, specific description thereof is omitted.

Referring to FIG. 40, the 2D map 10 is displayed on the touch screen 151. As described above with reference to FIG. 6, the user may apply a touch input in the first direction in order to check the 3D view of the first location 1. According to an example, the controller 180 may check whether the glasses-type mobile terminal 400 is activated.

When the glasses-type mobile terminal 400 is in an active state, according to an example, the controller 180 may display a menu 24 for displaying the 3D view on the glasses-type mobile terminal 400. The menu 24 shown in FIG. 40 is merely an example, and aspects of the present invention are not limited thereto. The shape or location of the menu 24, or text displayed in the menu 24 may be set differently.

When the menu 24 is selected, the controller 180 may transmit a signal for displaying the 3D view 30 to the glasses-type mobile terminal 400, as shown in FIG. 41. The controller of the glasses-type mobile terminal 400 may display the 3D view 30 through a display unit 451. A virtual screen 451 shown in FIG. 41 shows the 3D view 30 that is displayed through the display unit 451 of the glasses-type mobile terminal 400.

According to an example, the signal for displaying the 3D view 30 may include data of the 3D view 30 and data for controlling the 3D view 30 to be displayed. In this case, the data of the 3D view 30 may be generated in the background. Alternatively, the 3D view 30 may be displayed on the touch screen 151. However, this is merely exemplary, and aspects of the present invention are not limited thereto. If the 3D view 30 is able to be displayed on the glasses-type mobile terminal 400, any method can be applied.

However, the method using the menu 24 is merely exemplary, and aspects of the present invention are not limited thereto. According to another example, when the glasses-type mobile terminal 400 is in an active state, the controller 180 may immediately transmit to the glasses-type mobile terminal 400 a signal for displaying the 3D view.

According to an example, the glasses-type mobile terminal 400 may be activated while the 3D view 30 is displayed on the touch screen 151. In this case, the controller 180 may display a menu for displaying the 3D view 30 on the glasses-type mobile terminal 400. According to another example, when the glasses-type mobile terminal 400 may be activated while the 3D view 30 is displayed on the touch screen 151, the controller 180 may immediately transmit to the glasses-type mobile terminal 400 a signal for displaying the 3D view.

According to an example, when the 3D view 30 is displayed on the glasses-type mobile terminal 400, the power of the touch screen 151 may be turned off. According to another example, when the 3D view 30 is displayed on the glasses-type mobile terminal 400, the 2D map 10 may be displayed continuously on the touch screen 151. According to yet another example, when the 3D view 30 is displayed on the glasses-type mobile terminal 400, the 3D view 30 may be displayed on the touch screen 151.

Accordingly, a signal for displaying a 3D view is transmitted to the glasses-type mobile terminal, so that the user can check a 3D view of a selected area from the 2D map through the glasses-type mobile terminal.

Figure 42:
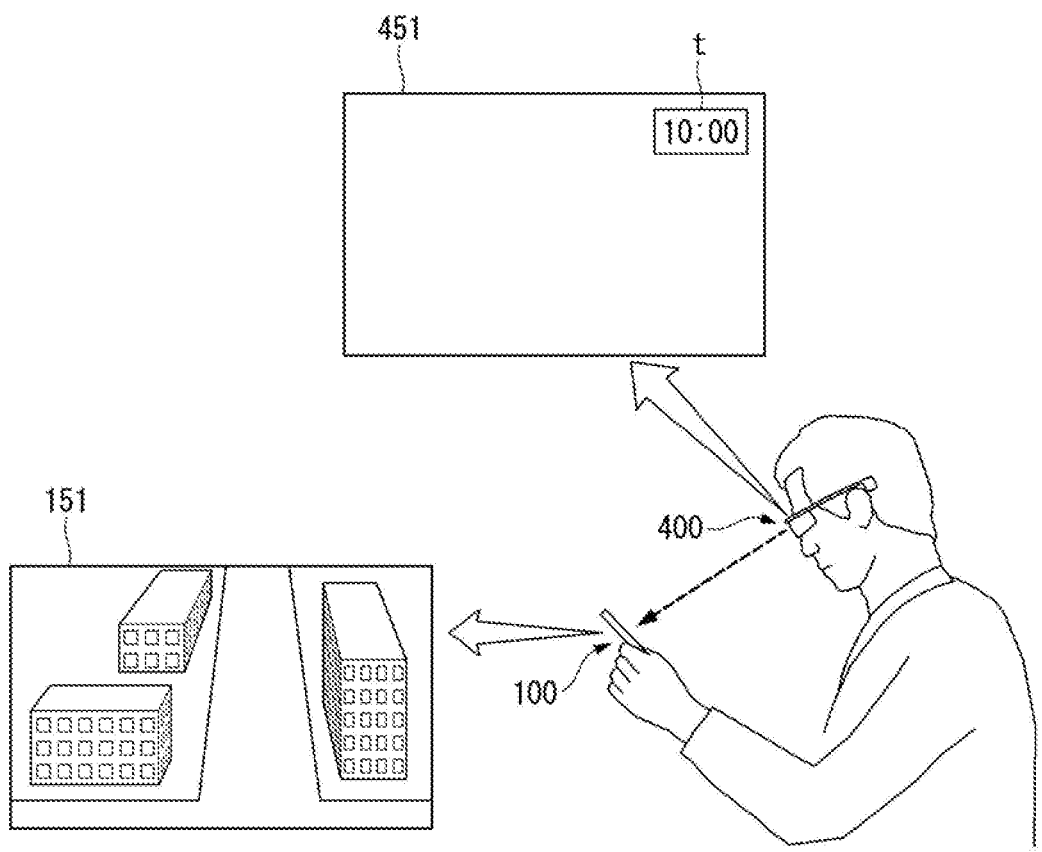
FIGS. 42 and 43 are diagrams illustrating an example according to an embodiment of the present invention, the example in which a 3D view is displayed in a mobile terminal or a glasses-type mobile terminal according to a user's gesture.
Figure 43:
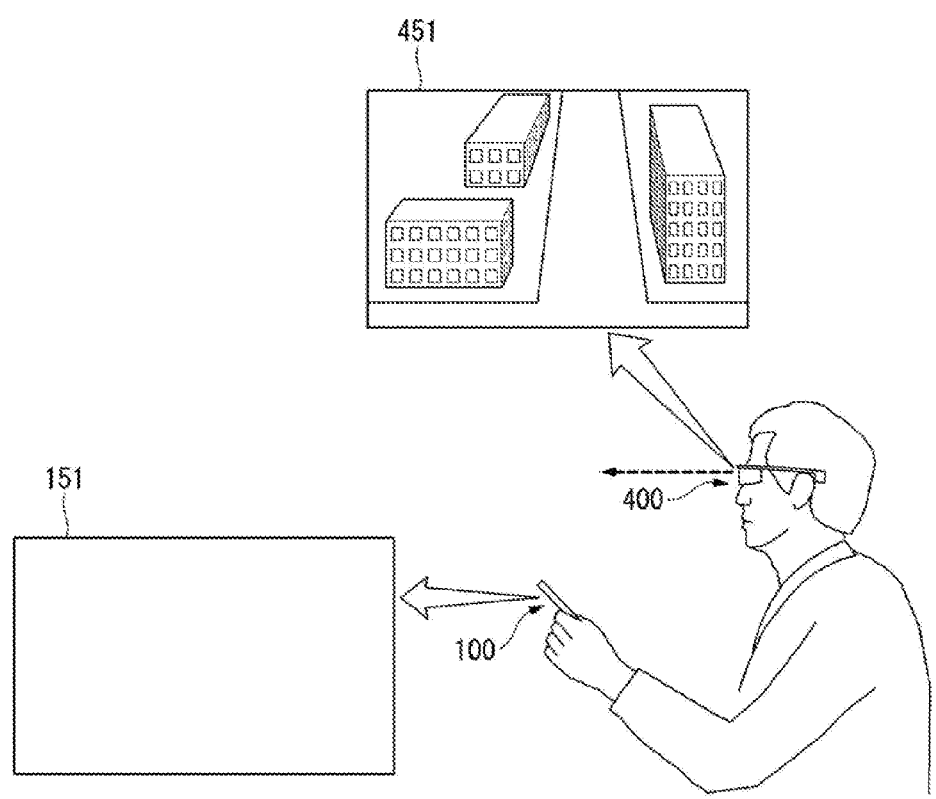

FIGS. 42 and 43 are diagrams illustrating an example according to an embodiment of the present invention, the example in which a 3D view is displayed in a mobile terminal or a glasses-type mobile terminal based on a user's gesture.

It is assumed that the 3D view 30 is displayed on the glasses-type mobile terminal 400. Referring to FIG. 42, a user wearing the glasses-type mobile terminal 400 may check the touch screen 151. When the user checking the touch screen 151 is sensed, the controller 180 may display the 3D view 30 on the touch screen 151. Sensing that the user wearing the glasses-type mobile terminal 400 checks the touch screen 151 complies with a well-known method, and thus, specific description thereof is omitted.

In this case, the controller of the glasses-type mobile terminal 400 may remove the 3D view 30 from being displayed. According to an example, the controller of the glasses-type mobile terminal 400 may display AR (augmented reality) information which is generally provided. For example, as shown in FIG. 42, the AR information, such as time display t, may be displayed on a virtual screen through the display unit 451.

Referring to FIG. 43, a user wearing the glasses-type mobile terminal 400 may not raise the head to check the touch screen 151. When the controller 180 of the glasses-type mobile terminal 400 senses a head-raising gesture, the controller 180 may transmit to the mobile terminal 100 a signal for requesting the 3D view 30.

In response to reception of the signal for requesting the 3D view 30, the controller 180 may transmit to the glasses-type mobile terminal 400 a signal for displaying the 3D view 30 displayed on the touch screen 151. The controller 180 of the glasses-type mobile terminal 400 may display the 3D view 30 in accordance with the signal for displaying the 3D view 30.

Accordingly, in the case where the user wearing the glasses-type mobile terminal checks the touch screen, the 3D view displayed on the glasses-type mobile terminal is displayed on a touch screen, so that the user can easily convert the 3D view from the glasses-type mobile terminal to the mobile terminal. Further, a signal for displaying the 3D view is transmitted to the glasses-type mobile terminal according to the gesture sensed by the glasses-type mobile terminal, so that the user may be enabled to check the 3D view on the glasses-type mobile terminal by taking a simple gesture.

Figure 44:
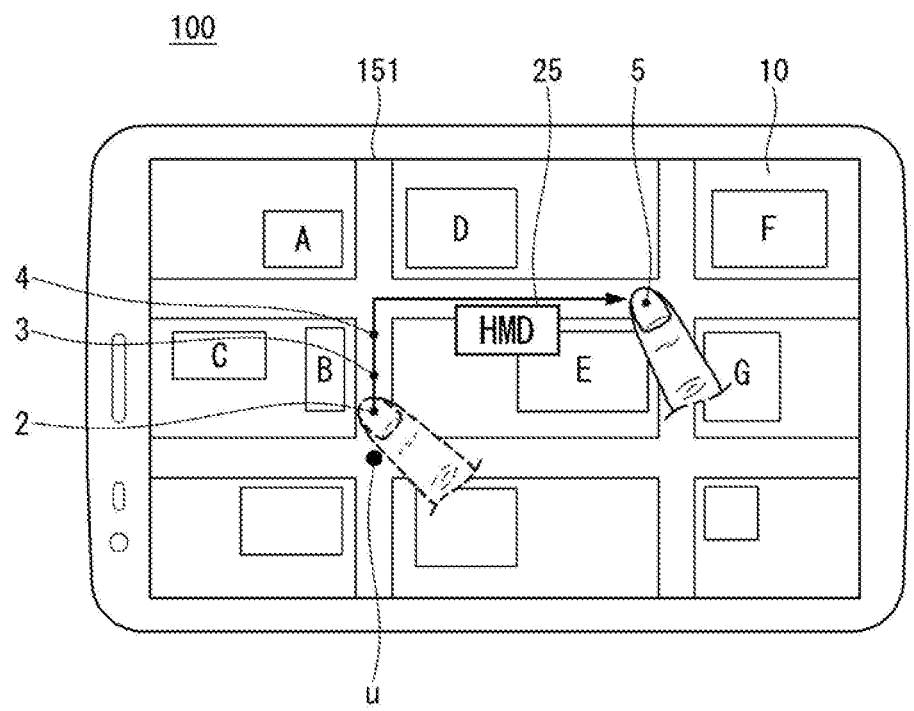
FIGS. 44 to 46 are diagrams illustrating an example according to an embodiment of the present invention, the example in which a gesture for requesting a 3D view to be displayed along movement of a view point is sensed from a glasses-type mobile terminal.
Figure 45:
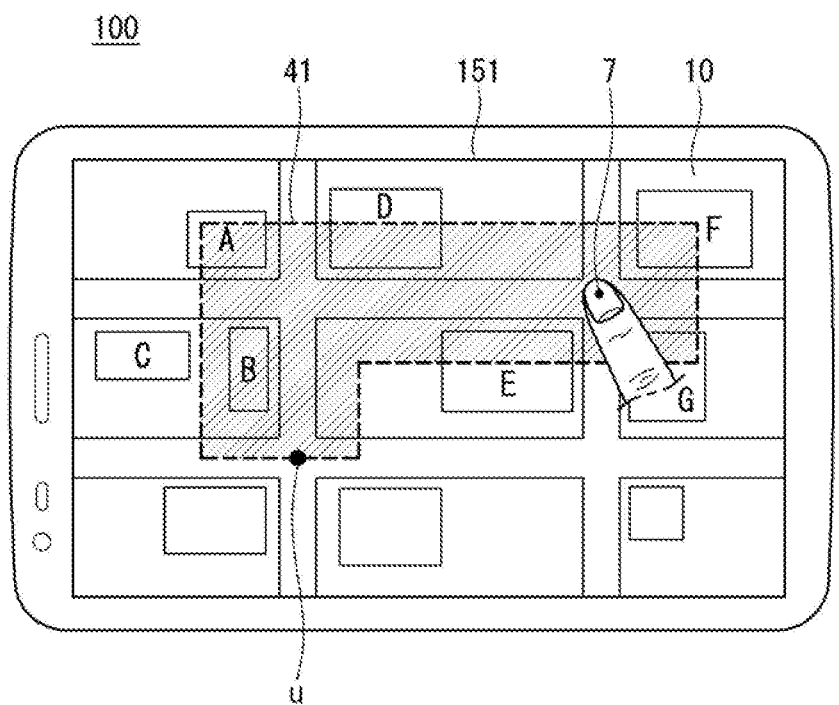
Figure 46:
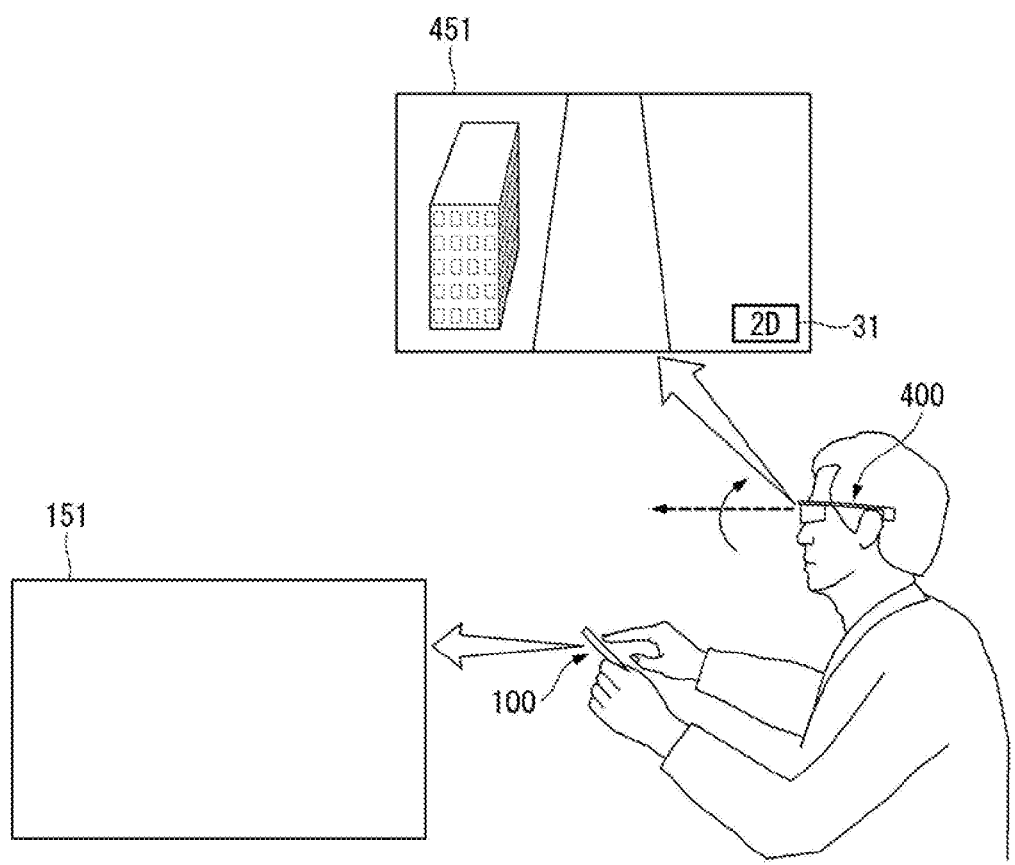

FIGS. 44 to 46 are diagrams illustrating an example according to an embodiment of the present invention, the example in which a gesture for requesting a 3D view along movement of a view point is sensed in a glasses-type mobile terminal.

Referring to FIG. 44, the 2D map 10 is displayed on the touch screen 151. As described above with reference to FIG. 12, a user may apply a touch input to check a 3D view from the first location 2 to the second location 5. According to an example, the controller 180 may check whether the glasses-type mobile terminal 400 is activated.

According to an example, when the glasses-type mobile terminal 400 is in an active state, the controller 180 may display a menu 25 for displaying the 3D view on the glasses-type mobile terminal 400. The menu 25 shown in FIG. 44 is merely exemplary, and aspects of the present invention are not limited thereto. The shape or location of the menu 25, or text displayed in the menu 25 may be set differently.

When the menu 25 is selected, the controller 180 may transmit to the glasses-type mobile terminal 400 a signal for displaying the 3D view. The controller of the glasses-type mobile terminal 400 may display, through the display unit 451, a 3D view along the movement of the view point from the first location 2 to the second location 5.

However, the method using the menu 25 is merely exemplary, and aspects of the present invention are not limited thereto. According to another example, when the glasses-type mobile terminal 400 is in an active state, the controller 180 may immediately transmit to the glasses-type mobile terminal 400 a signal for displaying the 3D view.

Referring to FIG. 45, the 2D map 10 in which the search area 41 is displayed is displayed on the touch screen 151, as described above with reference to FIG. 15. As described above with reference to FIG. 20, a user may apply a touch input for playing the 3D view to the particular location 7.

Referring to FIG. 46, a user wearing the glasses-type mobile terminal 400 may take a gesture of raising the head, while maintaining the touch input. When the controller of the glasses-type mobile terminal 400 senses the head-raising gesture, the controller transmit to the mobile terminal 100 a signal for requesting the 3D view 30.

In response to reception of a signal for requesting the 3D view 30, the controller 180 may transmit to the glasses-type mobile terminal 400 a signal for displaying the 3D view to the particular location 7. In this case, the signal for displaying the 3D view may include data of the 3D view along the movement of the view point to the particular location 7, the data which is stored in the memory 170. The controller of the glasses-type mobile terminal 400 may display the 3D view 30 in accordance with the signal for displaying the 3D view 30.

In FIGS. 45 and 46, the descriptions are based on the assumption that the particular location 7 is selected in the search area 41, but aspects of the present invention are not limited thereto. As shown in FIG. 44, even in the case where the user's gesture is sensed when a path of movement of the viewpoint is selected in the 2D map 10, the 3D view along the movement of the view point may be substantially and equally displayed on the glasses-type mobile terminal 400.

Accordingly, a signal for displaying the 3D view along the movement of the view point is transmitted to the glasses-type mobile terminal according to a gesture sensed by the glasses-type mobile terminal, so that the user can check the 3D view along the movement of the view point in the glasses-type mobile terminal with a simple gesture.

Figure 47:
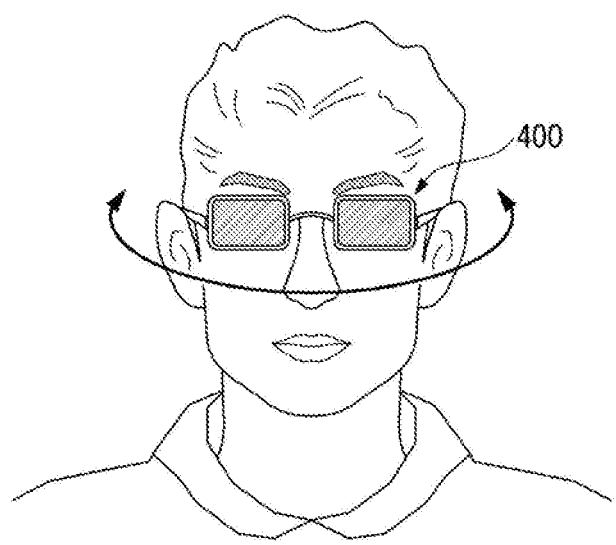
FIGS. 47 and 48 are diagrams illustrating an example according to an embodiment of the present invention, the example in which a 3D view is displayed along a path different from a path of movement of a view point.
Figure 48:
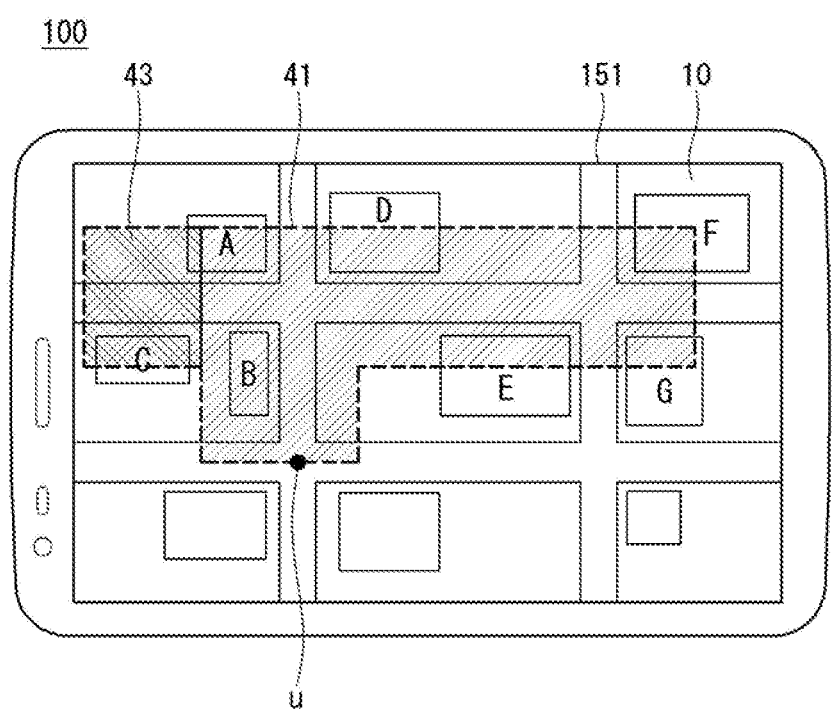

FIGS. 47 and 48 are diagrams illustrating an example according to an embodiment of the present invention, the example in which a 3D view along a path different from a path of movement of a view point is displayed.

As described above with reference to FIG. 45, it is assumed that a 3D view along the movement of the view point to the particular location 7 is displayed on the glasses-type mobile terminal 400. It is assumed that a user wants to check the left path, rather than the stored right path, at a time when the 3D view is passing the location 4 shown in FIG. 44. In this case, as shown in FIG. 47, the user may take a gesture of shaking the head from side to side.

When the controller of the glasses-type mobile terminal 400 senses the gesture of shaking the head from side to side, the controller of the glasses-type mobile terminal 400 may transmit to the mobile terminal 100 a signal for requesting a 3D view along a path different from the path of the movement of the view point. In response to reception of the signal for requesting the 3D view along the different path, the controller may stop displaying the 3D view along the path of the movement of the view point.

The user may turn his head to the left in order to check a path to the left from the location 4 shown in FIG. 44. The controller of the glasses-type mobile terminal 400 may transmit to the mobile terminal 100 a signal for rotating a direction, in which the 3D view is displayed, to the left. In response to reception of the signal for rotating the direction, in which the 3D view is displayed, to the left, the controller 180 may transmit to the glasses-type mobile terminal 400 a signal for displaying a 3D view for the left side path from the location 4.

According to an example, when a preset gesture is sensed in the glasses-type mobile terminal 400, the controller 180 may transmit to the glasses-type mobile terminal 400 a signal for displaying the 3D view in accordance with the sensed gesture. For example, a gesture of shaking a user's head from side to side may be set to request rotation of a direction in which the 3D view is displayed. Alternatively, a gesture of forwardly and backwardly touching the side portion of the frame part shown in FIG. 2 may be set to request forward or backward movement of a view point.

According to an example, when the preset gesture is not sensed in the glasses-type mobile terminal 400 for a predetermined period of time, the controller 180 may resume displaying of the 3D view along the path of the movement of the view point. However, this is merely exemplary, and aspects of the present invention are not limited thereto. According to another example, a gesture or an input for resuming displaying of the 3D view along the path of the movement of the view point may be set in advance.

According to an example, in response to reception of a signal for returning the 3D view to the 2D map, the controller 180 may match an area displayed in the form of 3D view 30 along the different path with an area in the 2D map 10. The controller 180 may set the area in the 2D map 10, which matches with the area displayed in the form of the 3D view 30, as a search area 43. As shown in FIG. 48, the controller 180 may display the search area 43 with the first search area 41 in the 2D map 10.

Accordingly, a signal for displaying a 3D view along the different path is transmitted to the glasses-type mobile terminal according to a gesture sensed from the glass-type mobile terminal, so that the user can check a 3D view along the different path by taking a simple gesture.

Figure 49:
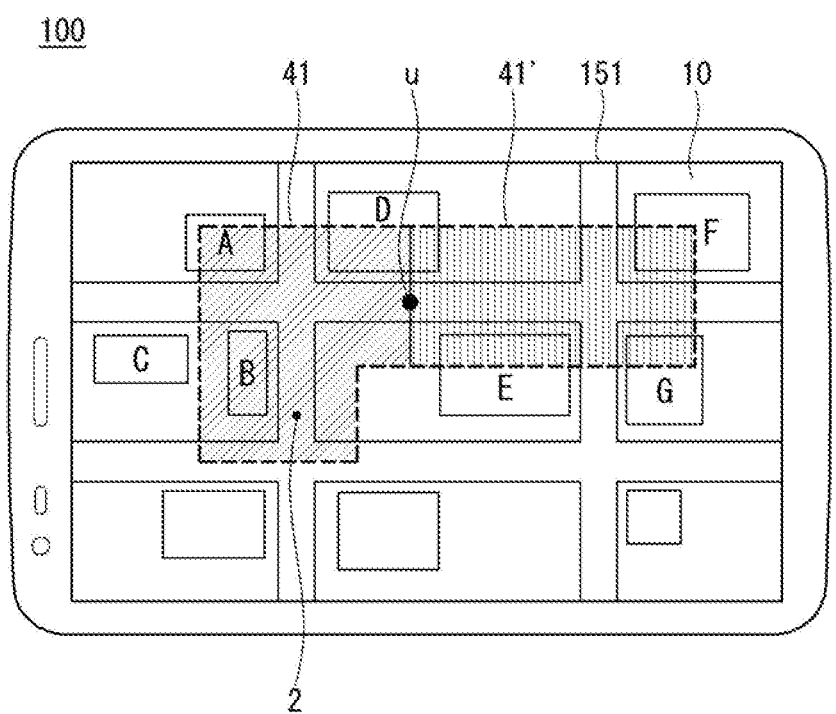
FIGS. 49 and 50 are diagrams for illustrating an example according to an embodiment of the present invention, the example in which a 3D view to a particular location from a current user location is displayed on a glasses-type mobile terminal.
Figure 50:
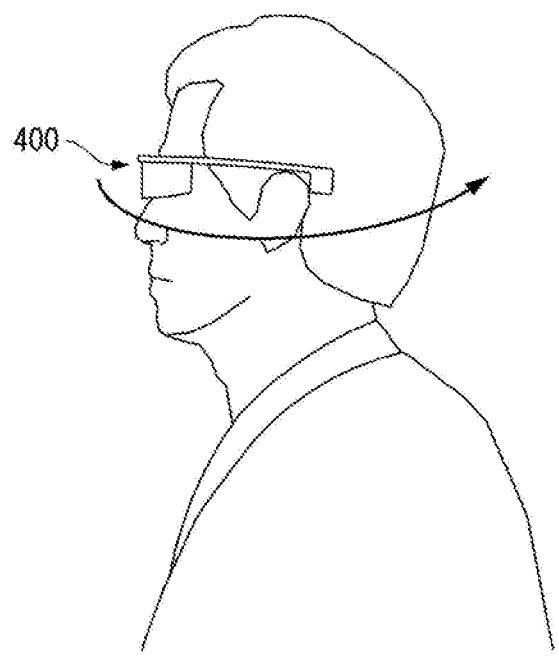

FIGS. 49 and 50 are diagrams illustrating an example according to an embodiment of the present invention, the example in which a 3D view to a particular location from a current user location is displayed on a glasses-type mobile.

According to an example, when a gesture for requesting a 3D view to the first location 2 from the current user location is sensed in the glasses-type mobile terminal 400, the controller 180 may transmit to the glasses-type mobile terminal 400 a signal for displaying the 3D view to the first location 2 from the current user location.

Referring to FIG. 49, location u of the mobile terminal 100, which indicates the current user location, is displayed in the 2D map 10. Compared with the example shown in FIG. 12, it is found that a user moves along the path that is searched using a 3D view.

According to an example, the controller 180 may obtain the current user location through the wireless communication unit 110. With respect to the current user location, the controller 180 may display the search area to be distinguishable from an area 41, which has been passed, and an area 41' which is to be passed.

According to an example, as shown in FIG. 50, a user may take a looking-back gesture to re-check a 3D view to the first location 2 from the current user location. When the looking-back gesture is sensed, the controller of the glasses-type mobile terminal 400 may transmit to the mobile terminal 100 a signal for requesting the 3D view to the first location 2 from the current user location. The controller 180 may transmit to the glasses-type mobile terminal 400 a signal for displaying the 3D view to the first location 2 from the current user location.

However, the looking-back gesture is merely exemplary, and aspects of the present invention are not limited thereto. The gesture for requesting the 3D view to the first location 2 from the current user location may be set differently.

According to an example, when a gesture for requesting a 3D view to a second location 5 from a current user location is sensed from the glasses-type mobile terminal 400, the controller 180 may transmit to the glasses-type mobile terminal 400 a signal for displaying the 3D view to the second location 5 from the current user location.

The gesture for requesting the 3D view to the second location 5 from the current location may be set in advance. When the preset gesture is sensed, the controller of the glasses-type mobile terminal 400 may transmit to the mobile terminal 100 a signal for requesting the 3D view to the second location 5 from the current user location. The controller 180 may transmit to the glasses-type mobile terminal 400 a signal for displaying the 3D view to the second location 5 from the current user location.

Accordingly, a signal for displaying a 3D view to a particular location from a current user location is transmitted to the glasses-type mobile terminal according to a gesture sensed from the glasses-type mobile terminal, so that the user can easily check a passed path or a path to be passed from the current user location by taking a simple gesture.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a memory configured to store 2D map data and 3D data for generating a 3D view;
a touchscreen configured to display information; and
a controller configured to:
cause the touchscreen to display a 2D map using the stored 2D map data;
receive a touch input to a first point on the displayed 2D map toward a first direction;
generate a 3D view corresponding to the displayed 2D map in response to the received touch input, wherein the generated 3D view is based on the stored 3D data and has a first viewpoint location corresponding to the first point and is toward the first direction; and
cause the touchscreen to display the generated 3D view.

2. The mobile terminal of claim 1, wherein the controller is further configured to:
cause the touchscreen to redisplay the 2D map; and
cause the touchscreen to display an indicator indicating a search area on the displayed 2D map corresponding to the 3D view.

3. The mobile terminal of claim 1, wherein the controller is further configured to:
cause the touchscreen to update the displayed 3D view in response to an input for moving from the first viewpoint location to a second viewpoint location;
cause the touchscreen to redisplay the 2D map along with an indicator indicating a search area on the displayed 2D map corresponding to the movement from the first viewpoint location to the second viewpoint location.

4. The mobile terminal of claim 3, wherein the controller is further configured to cause the memory to store the 3D view to be associated with information related to the movement from the first viewpoint location to the second viewpoint location.

5. The mobile terminal of claim 4, wherein the controller is further configured to cause the touchscreen to display a stored 3D view corresponding to a particular viewpoint location in response to a touch input selecting a point on the 2D map within the displayed indicator corresponding to the particular viewpoint location.

6. The mobile terminal of claim 4, further comprising a wireless communication unit, wherein:
the controller is further configured to cause the wireless communication unit to transmit a stored 3D view or the 2D map to an external device in response to a touch input comprising a multi-touch input followed by a touch drag toward an edge of the touchscreen; and
the stored 3D view or the 2D map view is selected for transmitting according to a characteristic of the multi-touch input.

7. The mobile terminal of claim 3, further comprising:
a wireless communication unit configured to communicate with a glasses-type mobile terminal,
wherein the controller is further configured to cause the wireless communication unit to transmit a signal for displaying the 3D view to the glasses-type mobile terminal when the glasses-type mobile terminal is in an active state.

8. The mobile terminal of claim 7, wherein the controller is further configured to cause the touchscreen to display the 3D view displayed at the glasses-type mobile terminal when a user wearing the glasses-type mobile terminal checks the touch screen.

9. The mobile terminal of claim 7, wherein the controller is further configured to cause the wireless communication unit to transmit a signal for displaying the 3D view to the glasses-type mobile terminal in response to a gesture sensed at the glasses-type mobile terminal for requesting the 3D view.

10. The mobile terminal of claim 7, wherein the controller is further configured to cause the wireless communication unit to transmit a signal to the glasses-type mobile terminal for displaying the 3D view following a movement of the first viewpoint location in response to a gesture sensed at the glasses-type mobile terminal for requesting the 3D view along the movement.

11. The mobile terminal of claim 10, wherein the controller is configured to transmit to the glasses-type mobile terminal a signal for displaying the 3D view following an alternate path in response to a gesture sensed at the glasses-type mobile terminal for requesting the 3D view along the alternate path while the 3D view following the movement of the first viewpoint location is displayed.

12. The mobile terminal of claim 7, wherein the controller is further configured to cause the wireless communication unit to transmit to the glasses-type mobile terminal a signal for displaying the 3D view following a movement from the current location of the user to the first viewpoint location in response to a gesture requesting a 3D view to the first viewpoint location sensed at the glasses-type mobile terminal.

13. The mobile terminal of claim 7, wherein the controller is further configured to cause the wireless communication unit to transmit to the glasses-type mobile terminal a signal for displaying the 3D view following a movement from the current location of the user to the second viewpoint location in response to a gesture requesting a 3D view to the second viewpoint location sensed at the glasses-type mobile terminal.

14. The mobile terminal of claim 1, wherein the controller is further configured to:
   cause the touchscreen to redisplay the 2D map; and
   cause the touchscreen to display an indicator for an area on the 2D map which was displayed in the 3D view for at least a threshold period of time.

15. The mobile terminal of claim 1, further comprising:
   a microphone; and
   a sensor configured to sense tilt or movement of the mobile terminal,
   wherein the controller is further configured to cause the touchscreen to change the displayed 2D map or the displayed 3D view based on an audio signal received via the microphone, a sensed tilt of the mobile terminal sensed via the sensor, or a movement of the mobile terminal sensed via the sensor.

16. The mobile terminal of claim 15, wherein the controller is further configured to:
   convert the displayed 2D map to the 3D view based on a tilt value corresponding to the sensed tilt; or
   convert the displayed 3D view to the 2D map based on the tilt value corresponding to the sensed tilt.

17. The mobile terminal of claim 15, wherein the controller is further configured to change the first direction by rotating it a rotational amount corresponding to a rotation of the mobile terminal sensed via the sensor.

18. The mobile terminal of claim 15, wherein the controller is further configured to change a scale of the displayed 2D map or the displayed 3D view according to a forward or backward movement of the mobile terminal sensed via the sensor.

19. The mobile terminal of claim 1, the controller is further configured to cause the touchscreen to display the 3D view in a reduced size in a first region of the touchscreen and display the 2D map in a second region of the touchscreen in response to another touch drag input from an edge of the touchscreen toward a center of the touchscreen.

20. A method for controlling a mobile terminal, the method comprising:
   displaying a 2D map on a touchscreen of the mobile terminal using 2D map data stored in a memory;
   receiving a touch input to a first point on the displayed 2D map toward a first direction;
   generating a 3D view corresponding to the displayed 2D map in response to the received touch input, wherein the generated 3D view is based on 3D data stored in the memory and has a first viewpoint location corresponding to the first point and is toward the first direction; and
   displaying the generated 3D view on the touchscreen.

* * * * *